(12) United States Patent
Greenblatt et al.

(10) Patent No.: US 11,679,794 B2
(45) Date of Patent: Jun. 20, 2023

(54) MATERIAL HANDLING CART

(71) Applicant: Marlin Steel Wire Products LLC, Baltimore, MD (US)

(72) Inventors: Drew Greenblatt, Potomac, MD (US); Andrew Montgomery, Baltimore, MD (US); Jacob A. Dieter, Rosedale, MD (US)

(73) Assignee: MARLIN STEEL WIRE PRODUCTS LLC, Baltimore, MD (US)

( * ) Notice: Subject to any disclaimer, the term of this patent is extended or adjusted under 35 U.S.C. 154(b) by 151 days.

(21) Appl. No.: 17/174,757

(22) Filed: Feb. 12, 2021

(65) Prior Publication Data

US 2021/0213987 A1 Jul. 15, 2021

Related U.S. Application Data

(63) Continuation-in-part of application No. 16/739,213, filed on Jan. 10, 2020.

(51) Int. Cl.
*B62B 3/02* (2006.01)
*B62B 3/16* (2006.01)
(Continued)

(52) U.S. Cl.
CPC ............ *B62B 3/02* (2013.01); *B62B 3/04* (2013.01); *B62B 3/1412* (2013.01); *B62B 3/16* (2013.01)

(58) Field of Classification Search
CPC .......... B62B 3/02; B62B 3/04; B62B 3/1412; B62B 3/16; B62B 3/104; B62B 3/102;
(Continued)

(56) References Cited

U.S. PATENT DOCUMENTS 2,536,561 A * 1/1951 Mickam ................. B62B 3/104
280/79.6
4,952,114 A * 8/1990 Langer ................... E04G 5/004
414/608
(Continued)

FOREIGN PATENT DOCUMENTS

| CN | 201558884 U | * | 8/2010 | |
| CN | 107458445 A | * | 12/2017 | ............. B62B 3/102 |
| CN | 108791425 A | * | 11/2018 | ............... B62B 3/02 |

*Primary Examiner* — James A Shriver, II
*Assistant Examiner* — Hilary L Johns
(74) *Attorney, Agent, or Firm* — Whiteford, Taylor & Preston, LLP; Gregory M. Stone

(57) ABSTRACT

A material handling cart is provided having a frame with engaging members for supporting a part carried by the cart. Each engaging member has an adjustable engaging surface that may include a material for protecting a corresponding surface of the part from damage. A plurality of wheels are each attached to the lower surface of the frame. A plurality of upper supports are attached to and extend upward from the frame, and lower stacking members are attached to and extend downward from the frame. Each upper support is configured for stacking engagement with a lower stacking member of a second material handling cart identical to the cart, to stack the second cart above the cart; and each lower stacking member is configured for stacking engagement with an upper support of a third material handling cart identical to the cart, to stack the cart above the third material handling cart.

27 Claims, 28 Drawing Sheets

(51) Int. Cl.
*B62B 3/14* (2006.01)
*B62B 3/04* (2006.01)

(58) Field of Classification Search
CPC .......... B62B 3/10; B62B 5/06; B62B 5/0096; B65G 2203/0461; B65G 49/05; B65G 7/04
USPC .................................................. 280/33.998
See application file for complete search history.

(56) References Cited

U.S. PATENT DOCUMENTS

| | | | | |
|---|---|---|---|---|
| 5,037,118 | A * | 8/1991 | Straube | B62B 1/262 |
| | | | | D34/24 |
| 5,722,512 | A * | 3/1998 | Lilja | B64F 5/50 |
| | | | | 187/244 |
| 6,099,001 | A * | 8/2000 | Barresi | B62B 3/10 |
| | | | | 280/79.6 |
| 6,719,308 | B2 * | 4/2004 | Parker | B62B 3/10 |
| | | | | 280/649 |
| 7,392,993 | B1 * | 7/2008 | Prohl | B62B 3/002 |
| | | | | 280/639 |
| 7,708,160 | B2 * | 5/2010 | Booth | B65D 25/20 |
| | | | | 220/666 |
| 9,061,697 | B2 * | 6/2015 | Veronie | B62B 5/0086 |
| 9,249,733 | B2 * | 2/2016 | Hallam | B64F 5/50 |
| 9,592,845 | B2 * | 3/2017 | Palma | B62B 3/04 |
| 10,232,761 | B2 * | 3/2019 | Hooper | B62B 3/04 |
| 10,351,151 | B1 * | 7/2019 | Nicholls | B62B 3/104 |
| 10,377,404 | B1 * | 8/2019 | Walash | B62B 3/10 |
| 10,906,667 | B2 * | 2/2021 | Kohn | F01D 25/285 |
| 10,946,985 | B2 * | 3/2021 | Leonard | B64F 5/50 |
| 2005/0132924 | A1 * | 6/2005 | Bothun | A47B 61/00 |
| | | | | 104/307 |
| 2005/0179235 | A1 * | 8/2005 | Stewart | B62D 63/061 |
| | | | | 280/656 |
| 2006/0091096 | A1 * | 5/2006 | Velez | B62B 3/102 |
| | | | | 211/60.1 |
| 2006/0231517 | A1 * | 10/2006 | Bothun | E04H 1/00 |
| | | | | 211/151 |
| 2007/0158345 | A1 * | 7/2007 | Booth | B65D 7/26 |
| | | | | 220/6 |
| 2009/0194958 | A1 * | 8/2009 | Lin | B62B 3/16 |
| | | | | 280/47.35 |
| 2009/0278326 | A1 * | 11/2009 | Rowland | B62D 63/06 |
| | | | | 410/80 |
| 2012/0318763 | A1 * | 12/2012 | Garton | B65D 71/70 |
| | | | | 211/85.22 |
| 2013/0056962 | A1 * | 3/2013 | Liu | B62B 3/022 |
| | | | | 280/651 |
| 2014/0001722 | A1 * | 1/2014 | Willey | B62B 3/02 |
| | | | | 280/47.35 |
| 2014/0300070 | A1 * | 10/2014 | Veronie | B62B 5/0086 |
| | | | | 280/79.2 |
| 2016/0214634 | A1 * | 7/2016 | Palma | B62B 3/1492 |
| 2017/0369087 | A1 * | 12/2017 | Dyson | B65D 88/12 |

\* cited by examiner

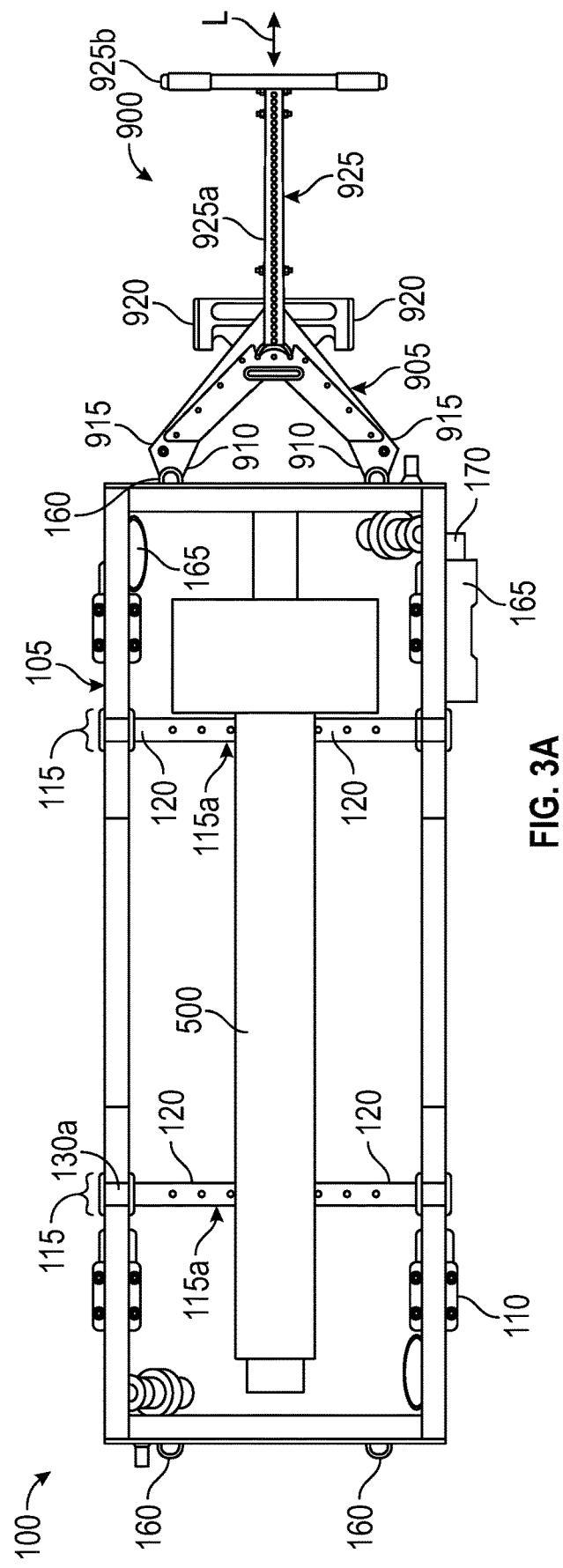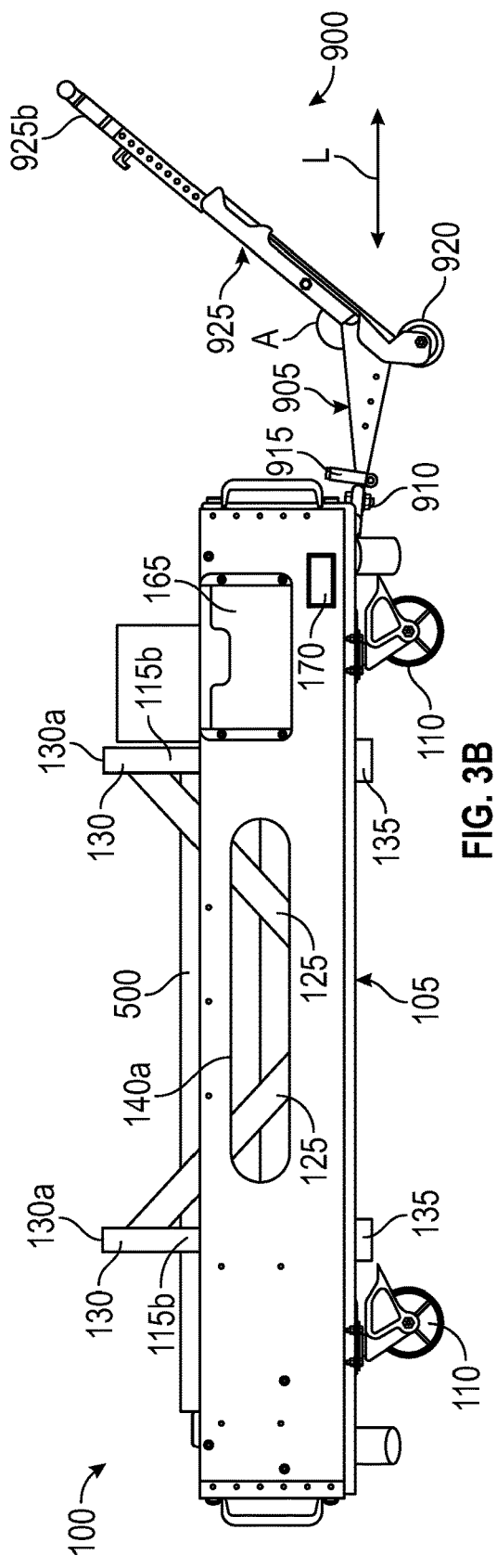
FIG. 3A
FIG. 3B

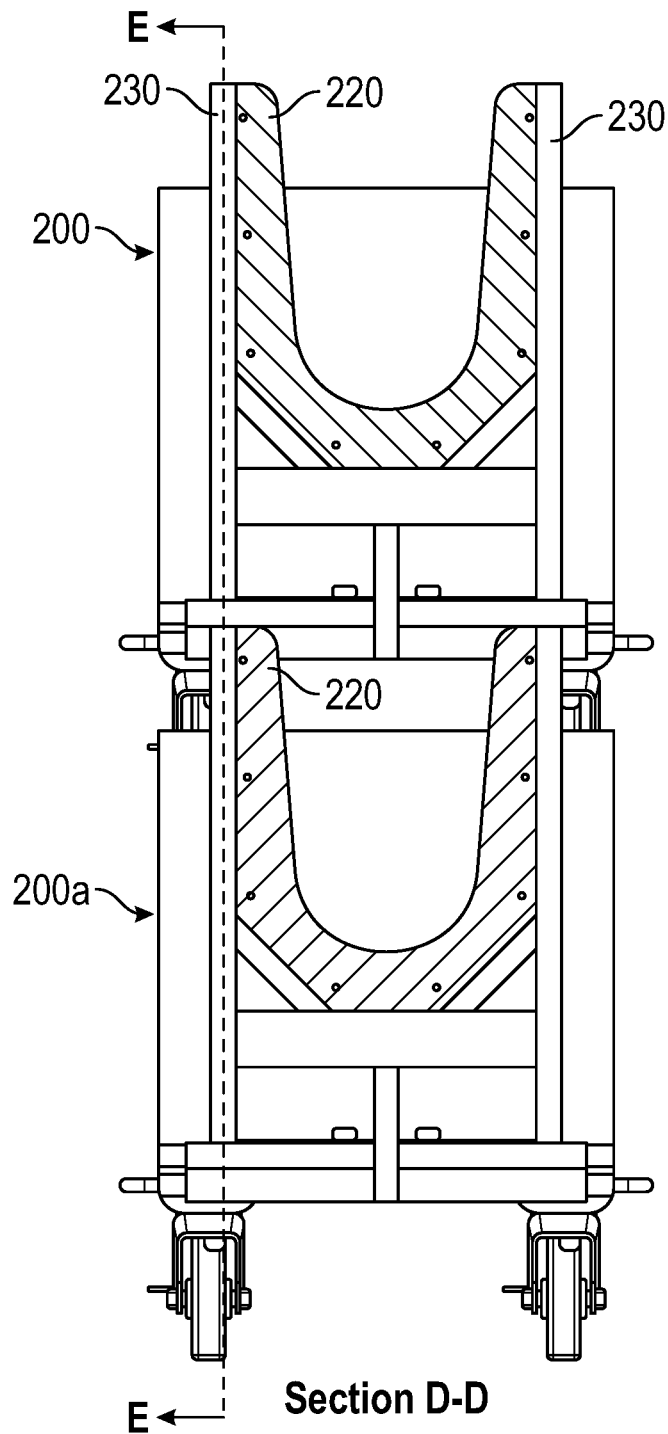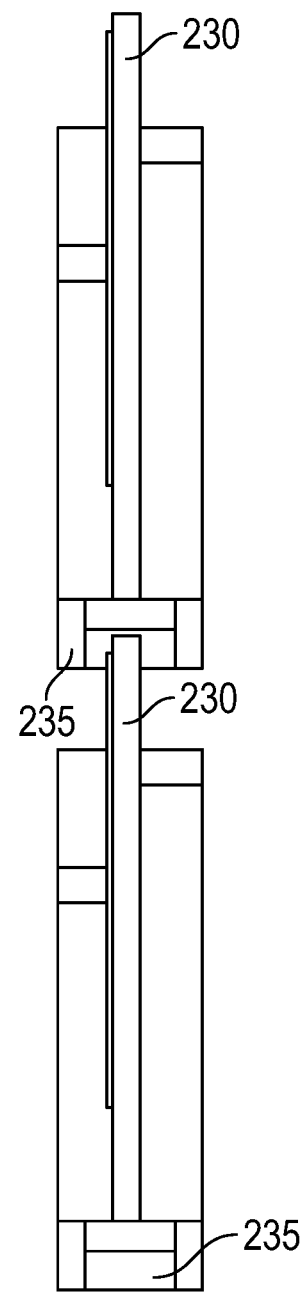
Section D-D
Section E-E
FIG. 7B
FIG. 7C

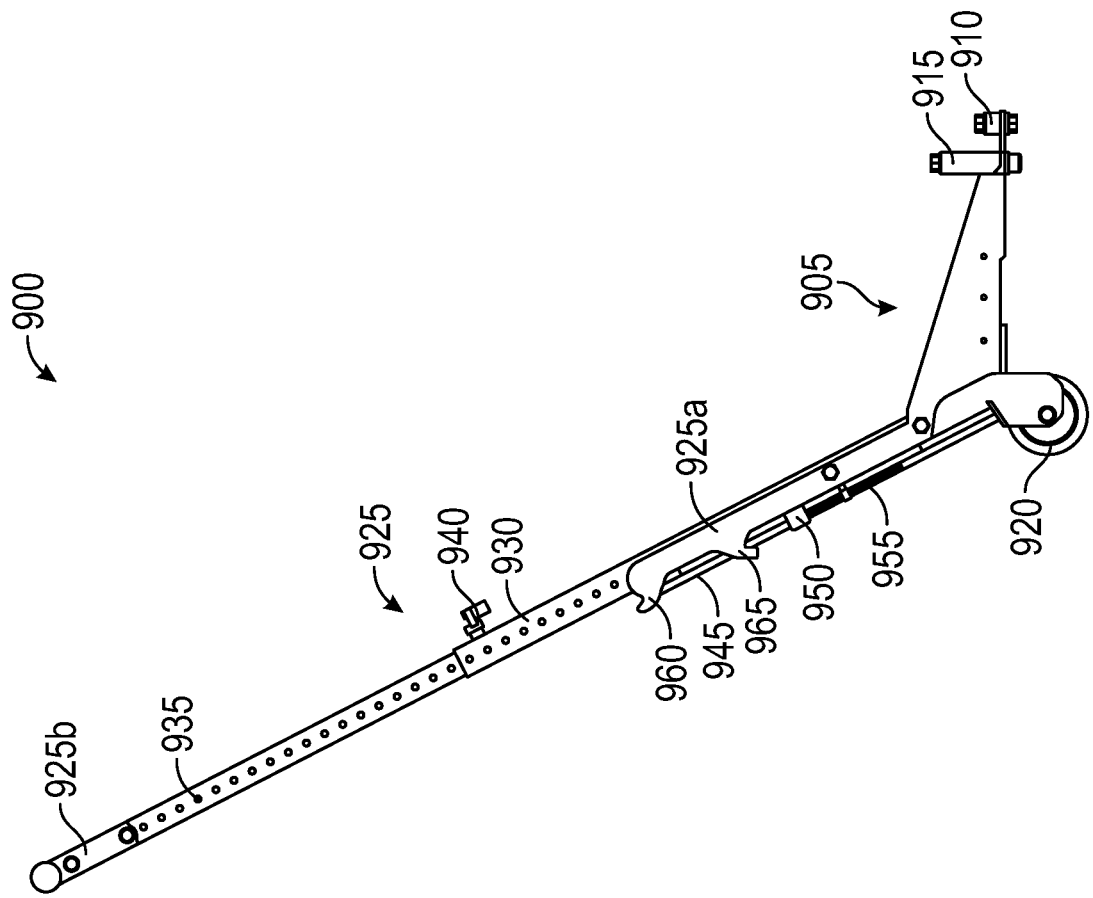
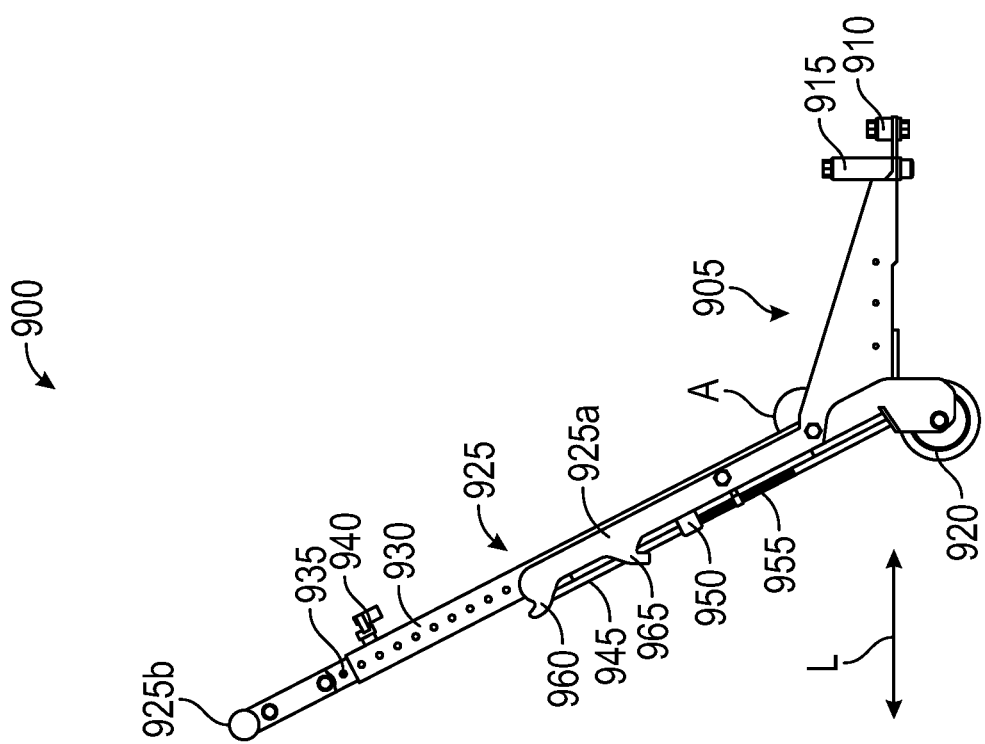
FIG. 9D
FIG. 9C

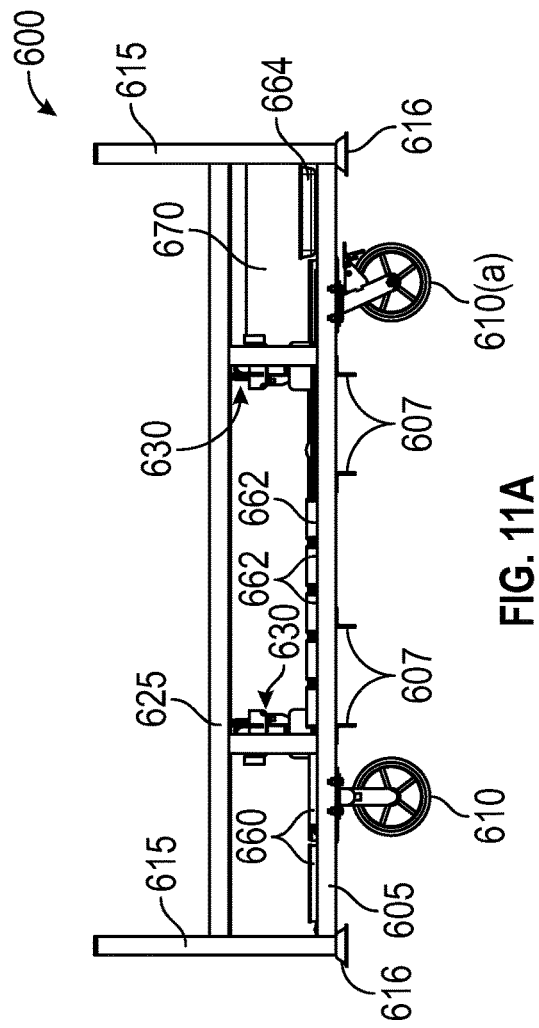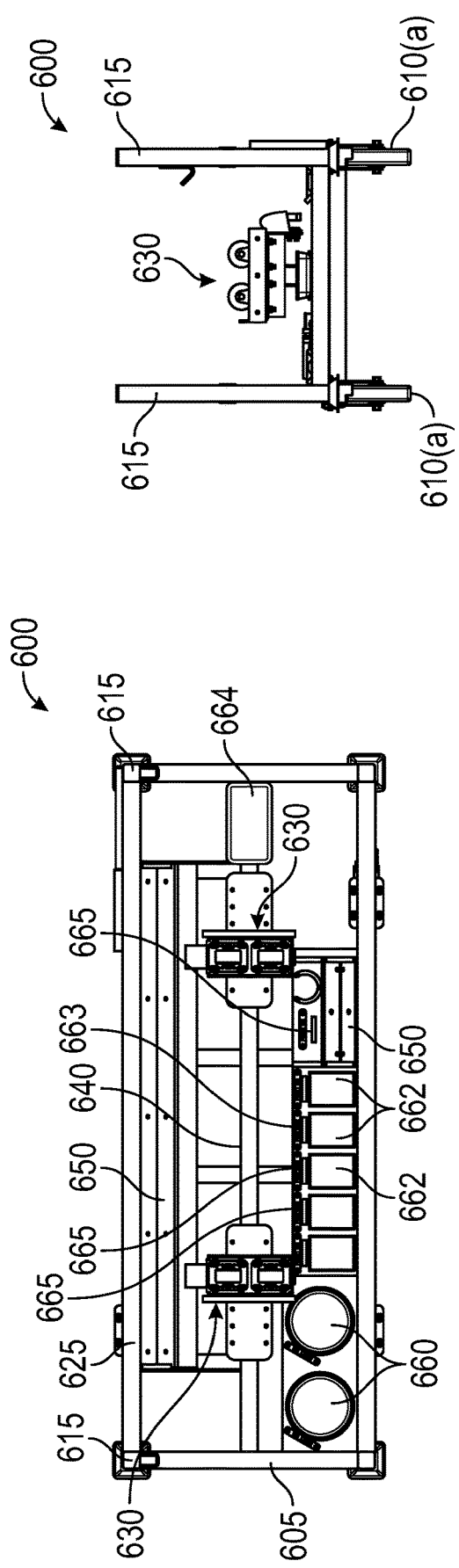

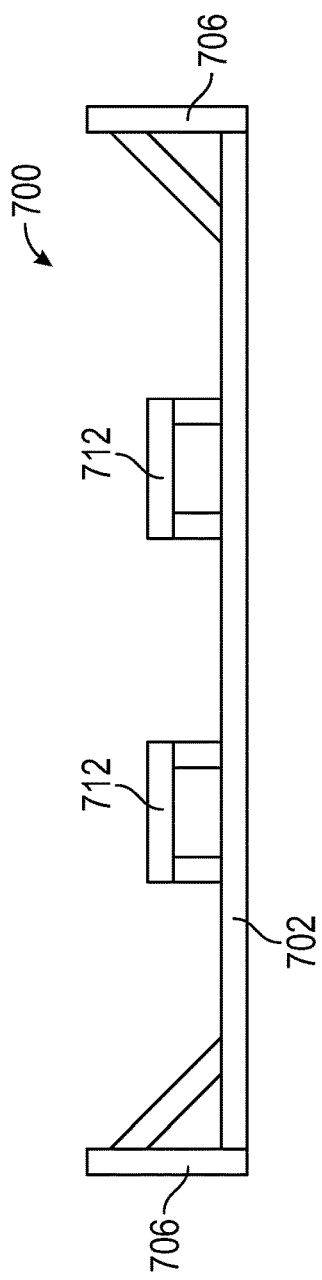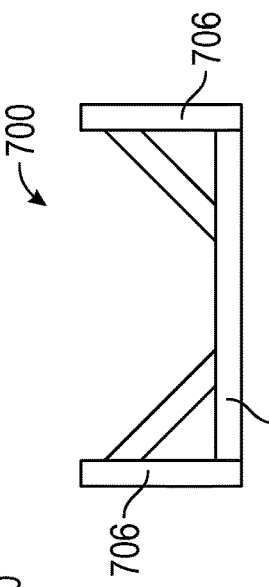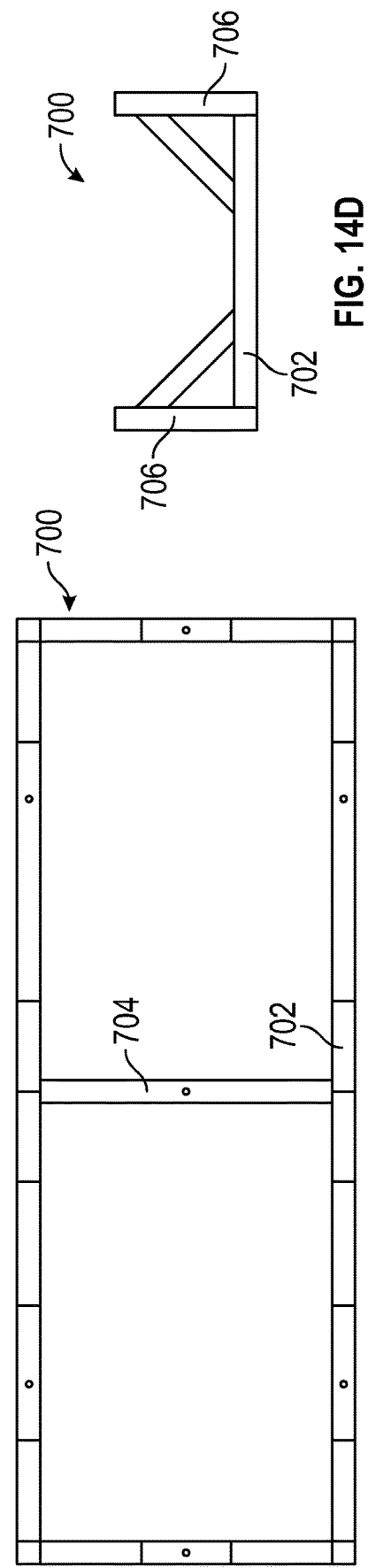
FIG. 14B
FIG. 14D
FIG. 14C

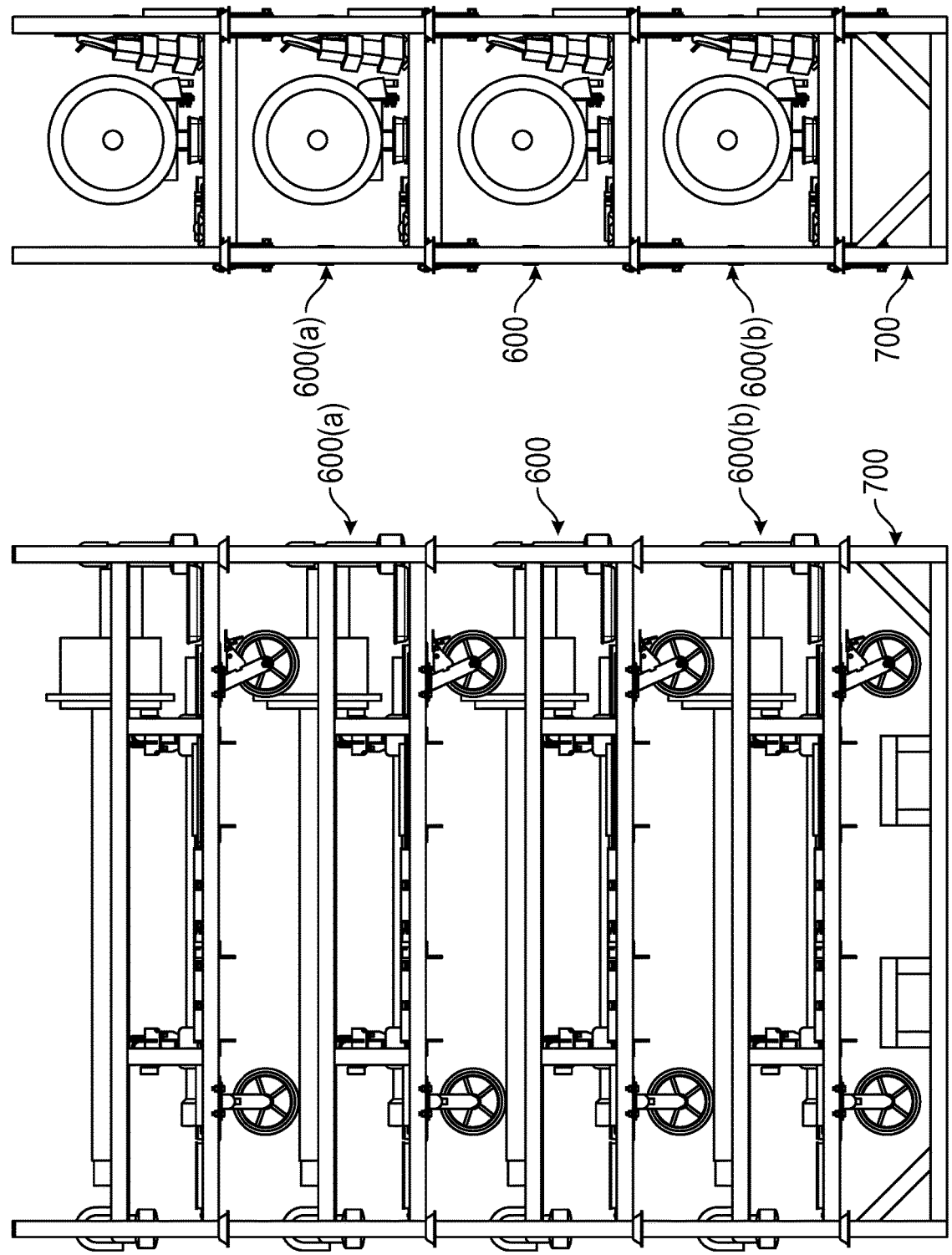

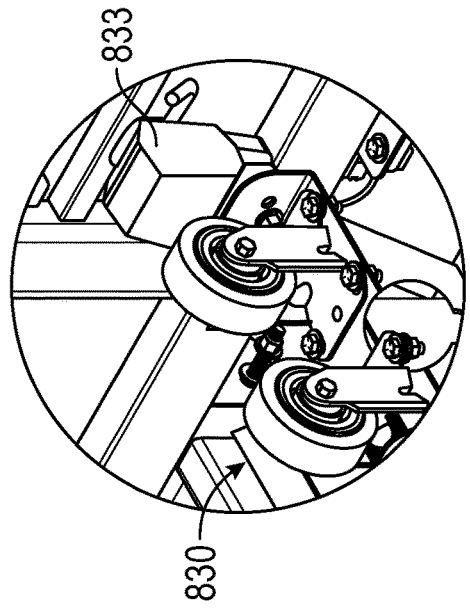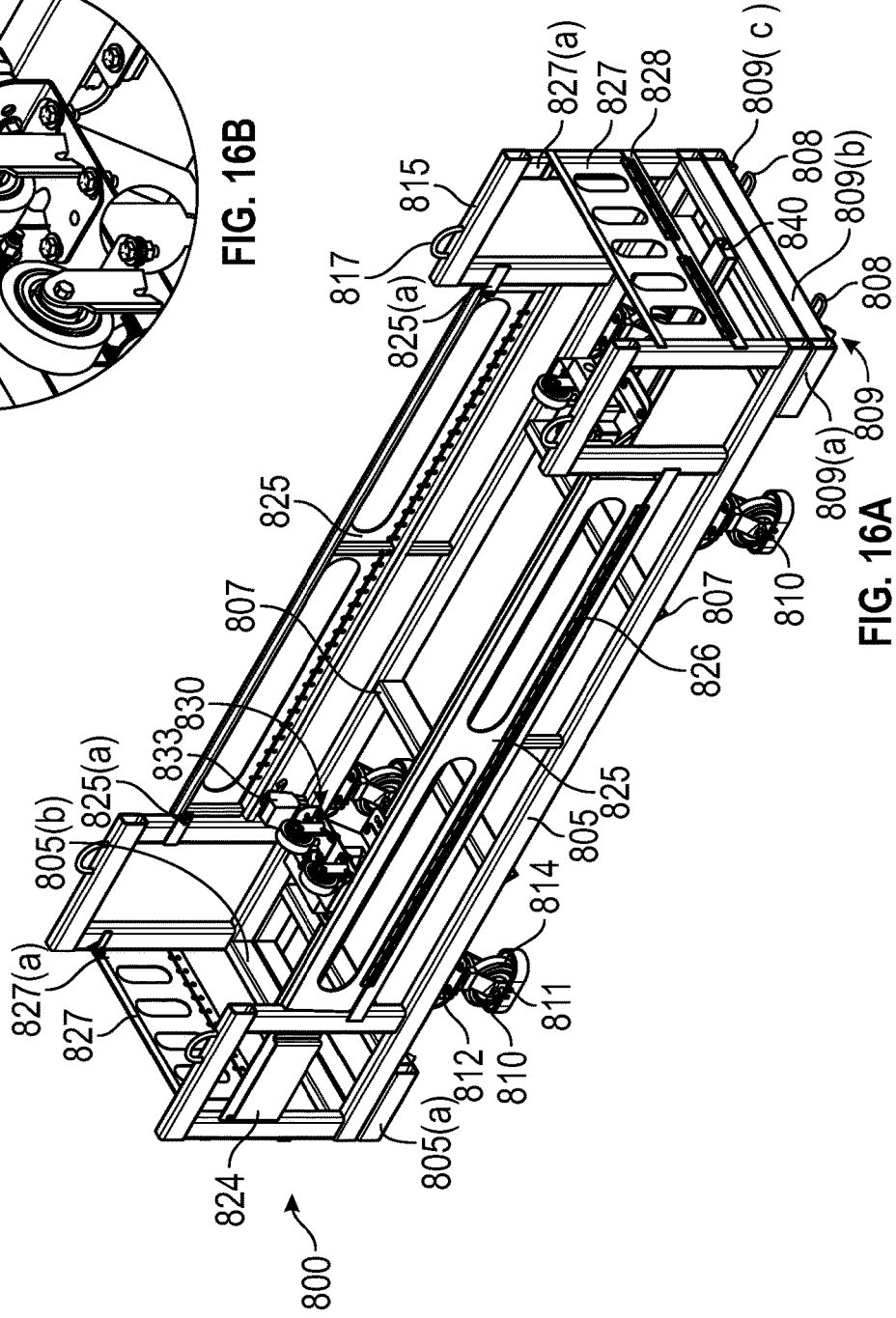

Section M-M

US 11,679,794 B2

MATERIAL HANDLING CART

CROSS-REFERENCE TO RELATED APPLICATIONS

This application is a continuation-in-part of co-pending and co-owned U.S. patent application Ser. No. 16/739,213 entitled "Material Handling Cart," filed with the United States Patent and Trademark Office on Jan. 10, 2020, the specification of which is incorporated herein by reference in its entirety.

FIELD OF THE INVENTION

The present invention relates to a material handling cart. More particularly, the present invention relates to a cart for handling precision components in a manufacturing, repair, or storage facility.

BACKGROUND OF THE INVENTION

Material handling devices, such as wheeled carts, are widely employed in a variety of industries to transport raw material, parts, components, subassemblies, assemblies, finished products, etc., throughout manufacturing, repair, and storage facilities. Some of these carts are simply wheeled pallets.

Such simple carts have their drawbacks when transporting precision components and assemblies, insofar as they cannot protect machined or polished surfaces from being scratched, dented, and/or otherwise damaged, as by metal-to-metal contact. For example, parts such as shafts with polished bearing journals or other precision machined surfaces can be easily damaged if they contact another shaft, are dropped, are bumped by another cart, etc. These disadvantages are multiplied when many precision parts must be transported within a facility.

There exists a need for a cart to transport precision parts that protects the parts from damage, while facilitating safe movement of a number of such parts.

SUMMARY OF THE INVENTION

Embodiments of the present invention provide a material handling cart comprising a frame including an upper surface and a lower surface. A plurality of wheels are each attached to the lower surface of the frame, and a plurality of engaging members are spaced from each other for supporting a part to be carried by the cart. Each engaging member is attached to the upper surface of the frame, and has an engaging surface for directly engaging the part. The engaging surface preferably comprises a material which protects a corresponding surface of the part from damage when the part is carried by the cart.

The material handling cart further comprises a plurality of upper supports attached to and extending upward from the frame, and lower stacking members attached and extending downward from the frame. Each upper support is configured for stacking engagement with a lower stacking member of a second material handling cart identical to the cart, to stack the second cart above the cart; and each lower stacking member is configured for stacking engagement with an upper support of a third material handling cart identical to the cart, to stack the cart above the third material handling cart.

In accordance with certain aspects of an embodiment of the invention, a material handling cart is provided, comprising: a frame; a plurality of wheels attached to a lower surface of the frame; a plurality of engaging members configured to support a part to be carried by the cart above the frame, wherein at least one of the engaging members is adjustably positionable along a longitudinal axis of the frame, and wherein the engaging members are configured to mount the part for rotation about an axis that is parallel to the longitudinal axis of the frame; a plurality of upper supports extending upward from the frame; and a plurality of lower stacking members affixed to the lower surface of the frame; wherein the lower stacking members are configured to engage upper supports of a second material handling cart having an identical configuration to the material handling cart so as to enable stacking of the material handling cart on top of the second material handling cart; and wherein the upper supports are configured to engage lower stacking members of a third material handling cart having an identical configuration to the material handling cart so as to enable stacking of the third material handling cart on top of the material handling cart.

BRIEF DESCRIPTION OF THE DRAWINGS

FIGS. 3A and 3B are top and side views, respectively, of the material handling cart depicted in FIG. 1 when it is carrying a part, with a pusher attached.

FIG. 7B is a cross-sectional view taken along line D-D in FIG. 7A.

FIG. 7C is a cross-sectional view taken along line E-E in FIG. 7B.

FIGS. 9C-9E are side views of the pusher depicted in FIGS. 9A-B.

FIG. 11A is a side view of the material handling cart of FIG. 10.

FIG. 11B is a top view of the material handling cart of FIG. 10.

FIG. 11C is an end view of the material handling cart of FIG. 10.

FIG. 14B is a side view of the cart stacking base of FIG. 14A.

FIG. 14C is a top view of the cart stacking base of FIG. 14A.

FIG. 14D is an end view of the cart stacking base of FIG. 14A.

FIG. 15A is a side view of multiple material handling carts of FIG. 10 stacked on top of one another and on the stacking base of FIG. 14A.

FIG. 15B is an end view of the stacked material handling carts and stacking base of FIG. 15A.

FIG. 16A is a top perspective view of a material handling cart according to further aspects of an embodiment of the invention.

FIG. 16B is a close up perspective view of a roller support trolley on the material handling cart of FIG. 16A.

DETAILED DESCRIPTION OF THE PREFERRED EMBODIMENTS

Figure 1:
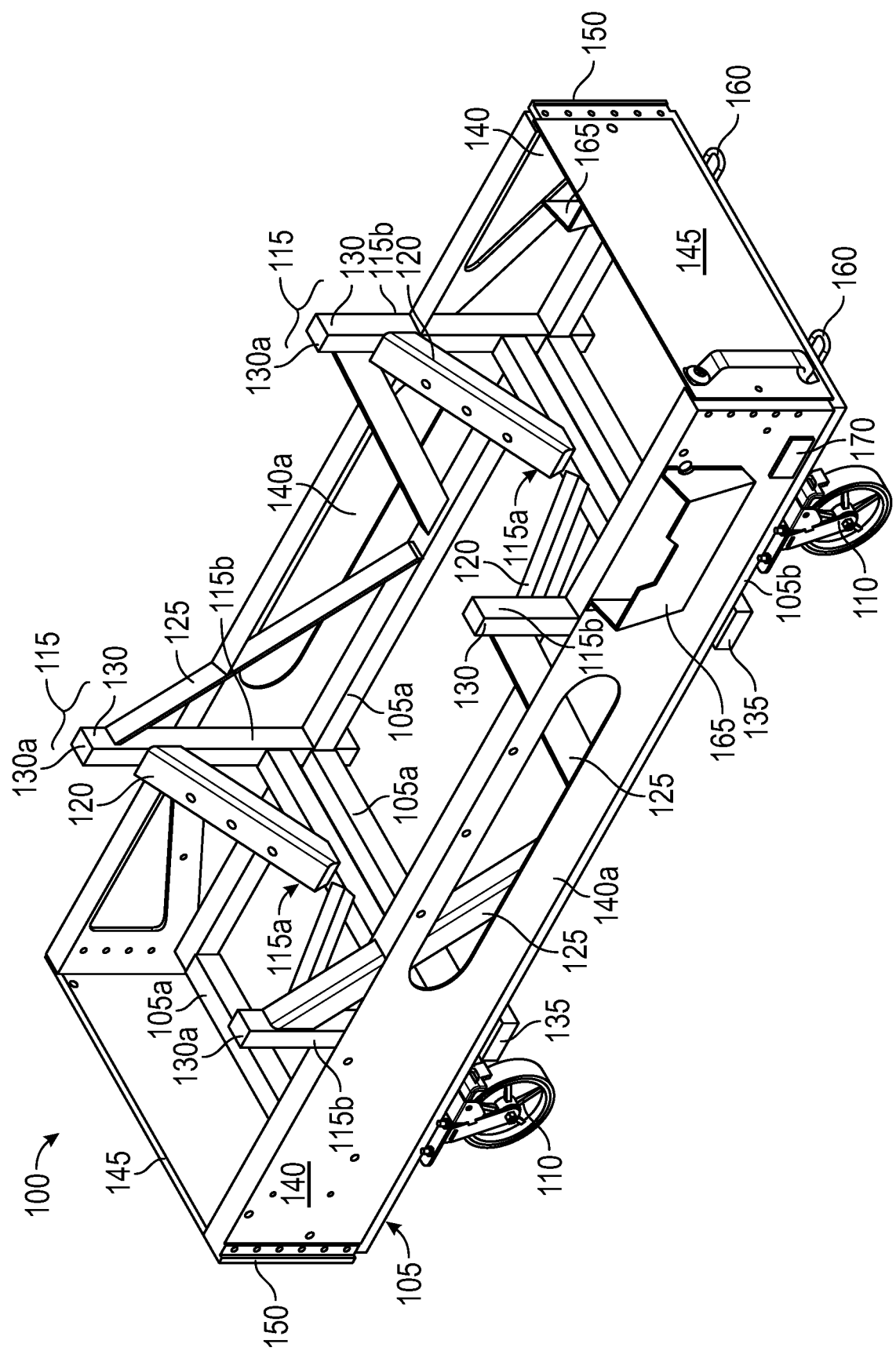
FIG. 1 is a perspective view from above of a material handling cart according to certain aspects of an embodiment of the invention.

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Unless otherwise indicated, all dimensions shown in the attached drawings are exemplary only and should not be construed as limiting the scope of the invention to those specific dimensions.

Embodiments of the present disclosure advantageously provide a material handling cart that securely holds delicate and/or precision components and inhibits metal-on-metal contact and other unwanted contact while moving around a manufacturing facility. Additionally, the disclosed material handling device advantageously supports multiple transportation configurations.

Embodiments of material handling carts in accordance with embodiments of the present disclosure will now be described with reference to FIGS. 1-19(b).

In the exemplary configuration shown in FIGS. 1-5D, a material handling cart 100 for transporting a part such as a shaft 500 may have a rectangular shape; for example, about 84 inches by 30 inches, and the shaft 500 weighs approximately 180 pounds. In other configurations, material handling cart 100 may have different dimensions and shapes, such as a round shape, a square shape, a triangular shape, etc.

Cart 100 of this configuration comprises a steel frame 105 including an upper surface 105a and a lower surface 105b, and a plurality of wheels 110, such as conventional caster wheels, each wheel 110 attached to the lower surface 105b of the frame 105. Wheels 110 can be swivel caster wheels, each having a lock to prevent motion of the wheel.

Figure 4B:
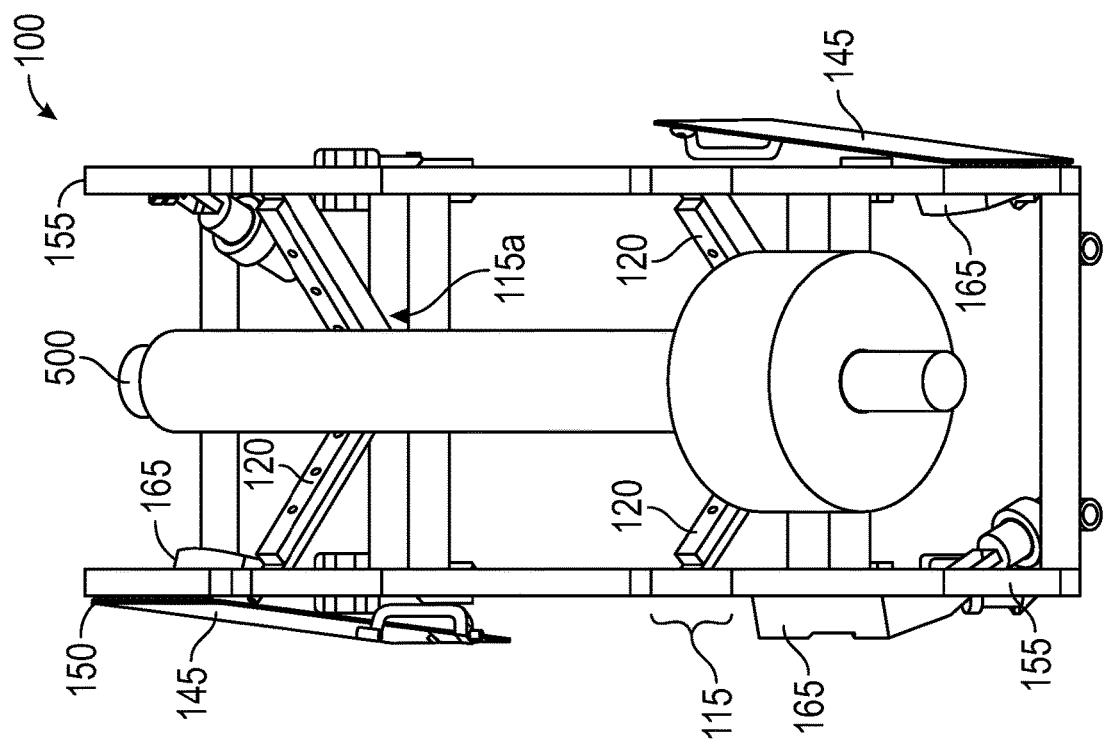
FIGS. 4A and 4B are top perspective views of the material handling cart depicted in FIG. 1 when it is carrying a part.
Figure 4A:
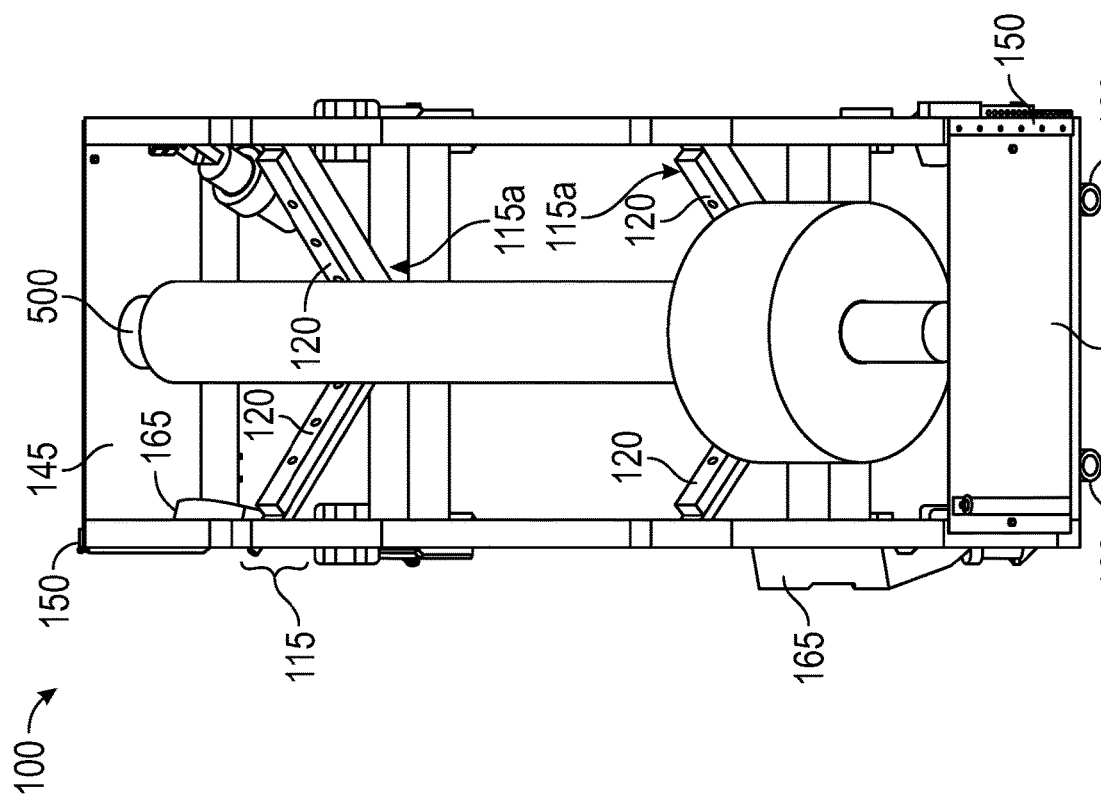
Figure 5A:
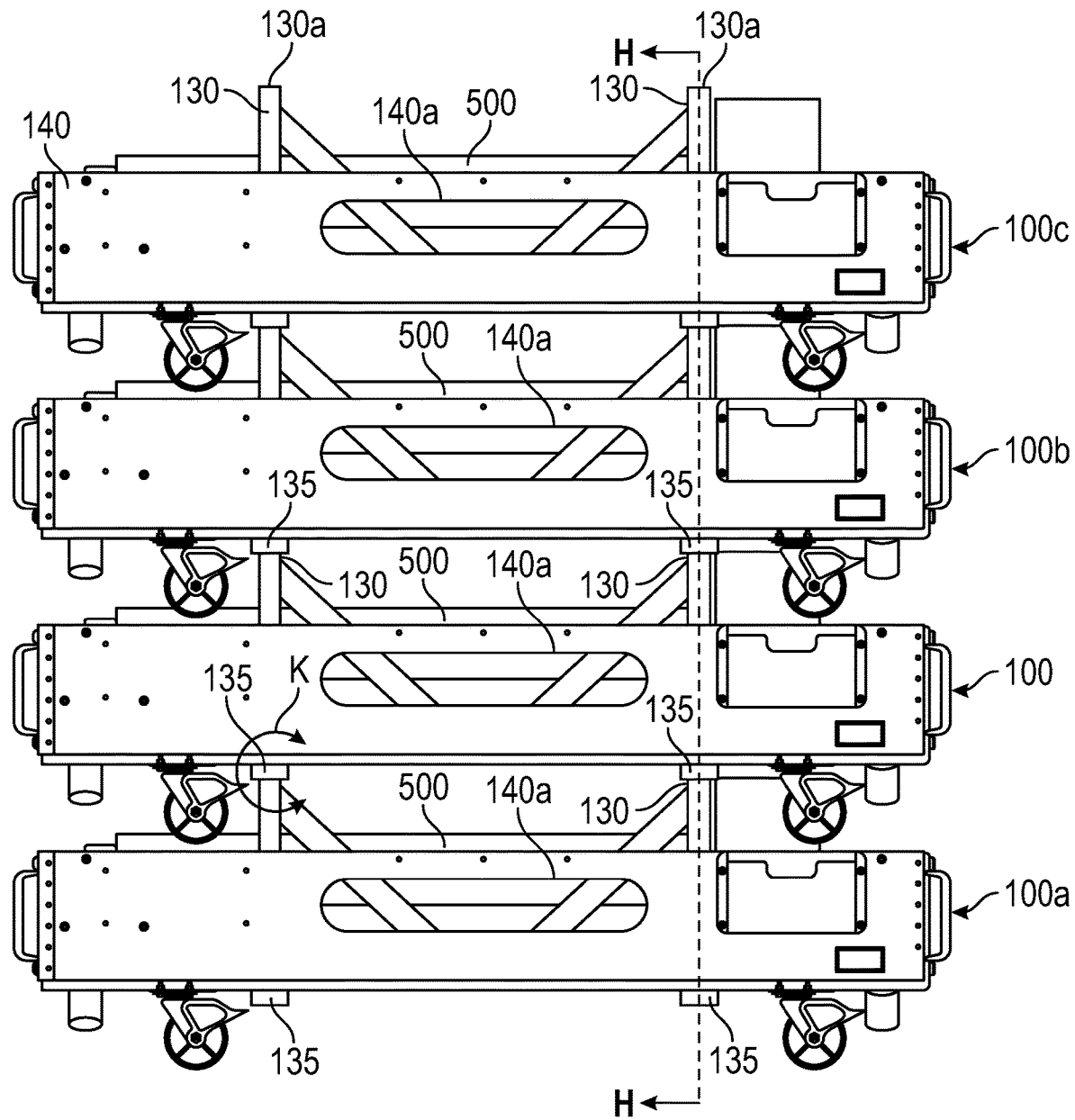
FIG. 5A is a side view of several examples of the material handling cart depicted in FIG. 1, each carrying a part and stacked on top of each other.
Figure 5D:
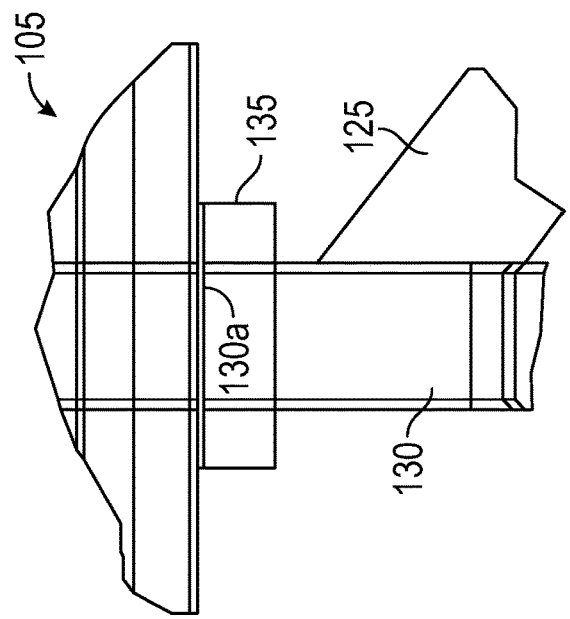
FIG. 5D is a cross-sectional view taken along line K in FIG. 5A.
Figure 5C:
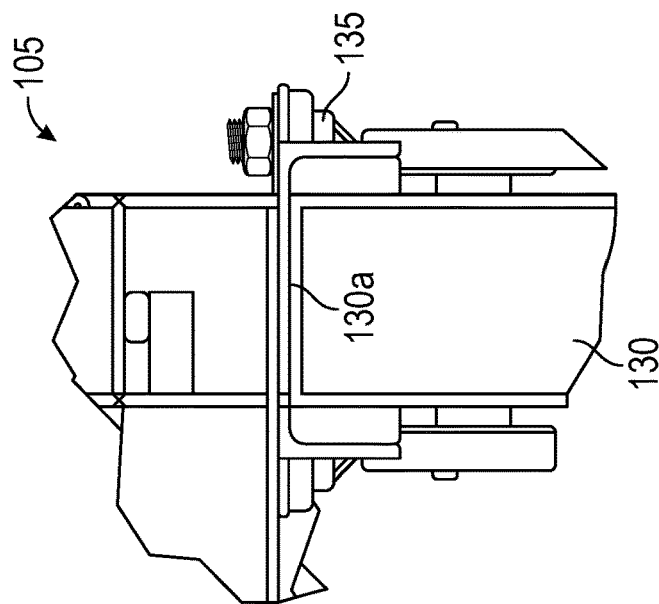
FIG. 5C is a cross-sectional view taken along line J in FIG. 5B.
Figure 5B:
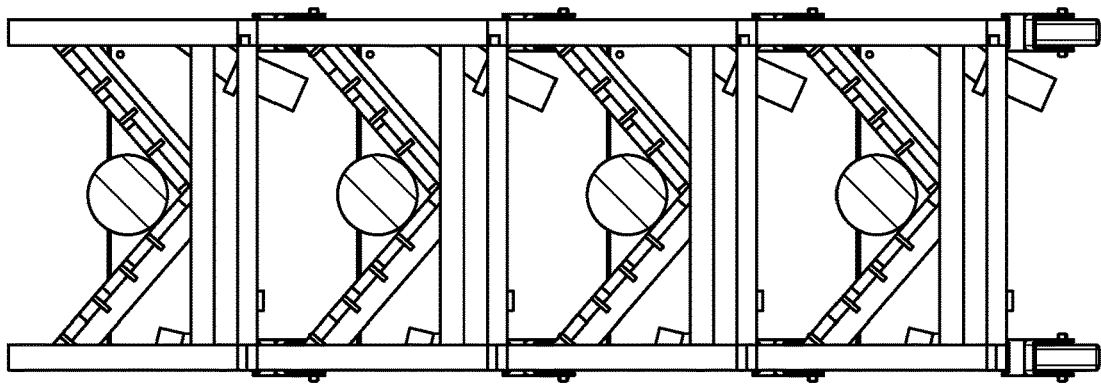
FIG. 5B is a cross-sectional view taken along line H-H in FIG. 5A.
Figure 6A:
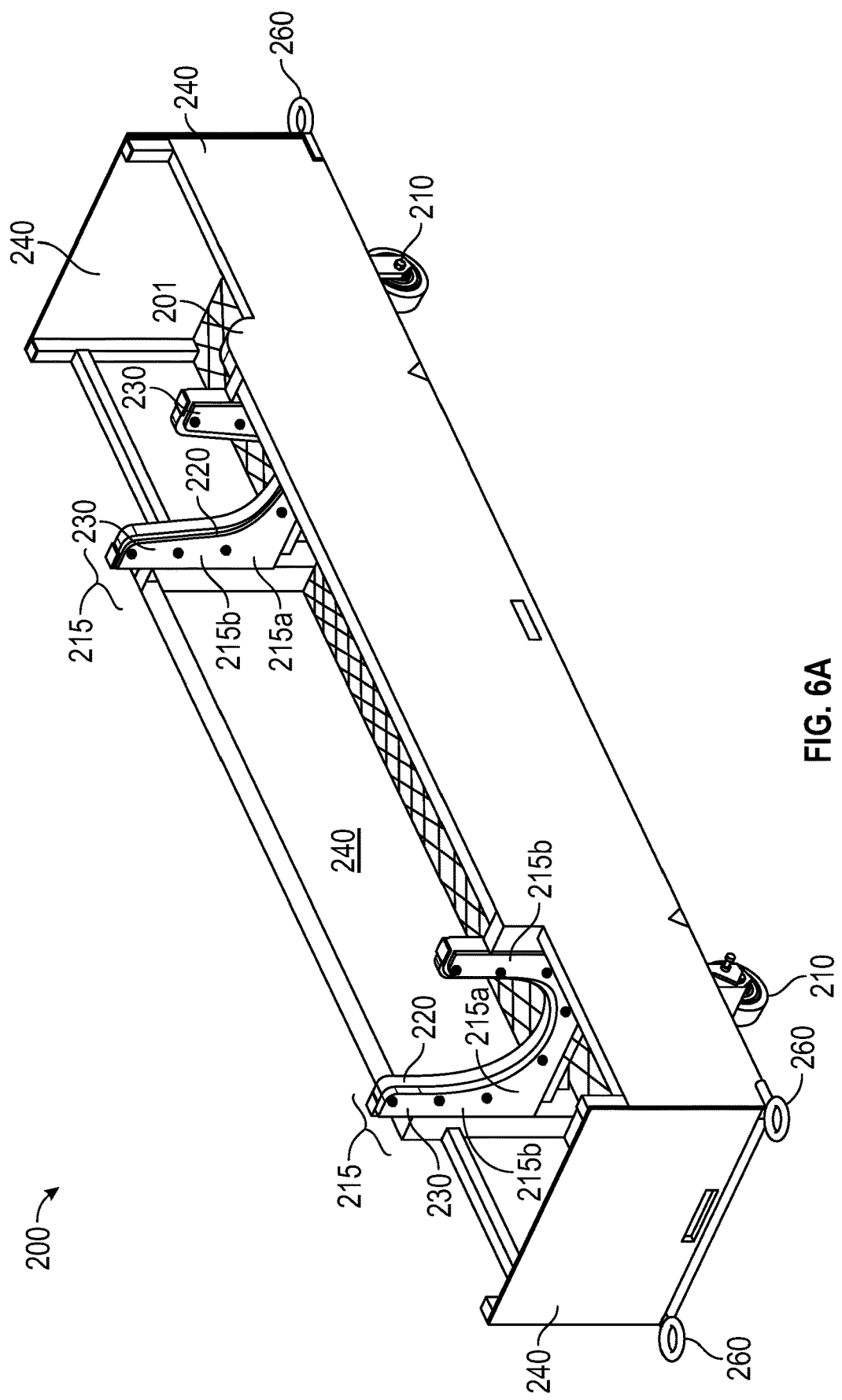
FIG. 6A is a perspective view from above of a material handling cart according to further aspects of an embodiment of the invention.
Figure 6B:
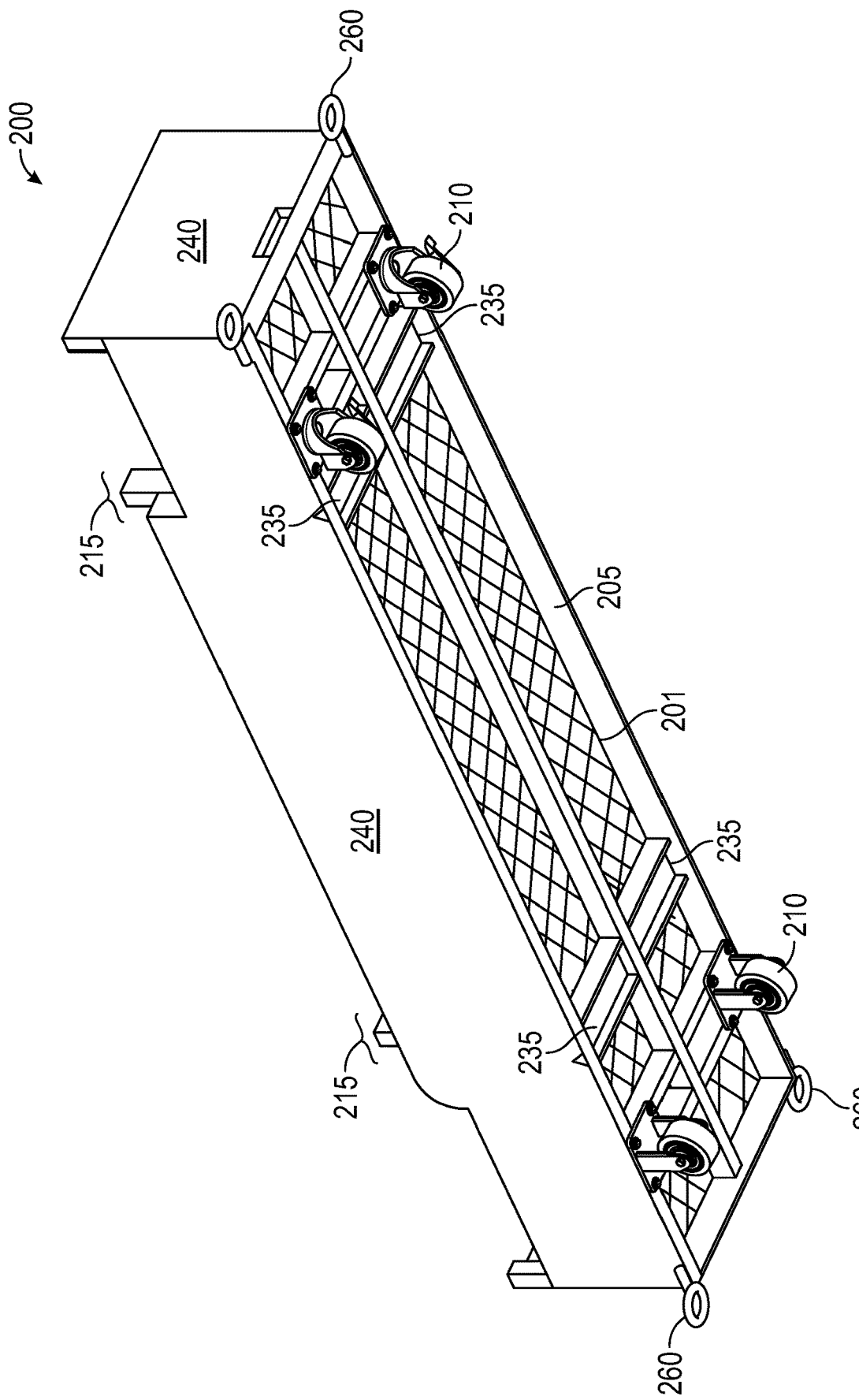
FIG. 6B is a perspective view from below of the material handling cart depicted in FIG. 6A.

In certain configurations particularly shown in FIGS. 6A-B, a material handling cart 200 has a frame 205 and wheels 210 similar to cart 100, and also has a floor 201. Floor 201 is formed from steel mesh, such as 1½" #9 flattened expanded steel, and is attached to the upper surface of the frame 205 of cart 200, as by welding. In other configurations, floor 201 comprises solid steel sheet, perforated steel sheet, aluminum mesh, aluminum sheet, perforated aluminum sheet, etc. When present, the openings in the material selected for floor 201 advantageously allow smaller items to fall through while preventing larger items from falling through. Those of skill in the art will understand that the cart 100 of FIGS. 1-5D, as well as the other cart configurations disclosed herein, may also include a floor similar to floor 201.

Referring again to FIGS. 1-4B, a plurality of engaging members 115, such as steel tubes, are spaced from each other for supporting the part (such as shaft 500) to be carried by the cart 100. Each engaging member 115 is attached to the upper surface 105a of the frame 105, as by welding, and has an engaging surface for directly engaging the part 500, which in the configuration of FIGS. 1-5D is a pair of engaging surfaces 120. The engaging surface(s) 120 comprises a material which protects a corresponding surface of the part from damage when the part is carried by the cart.

In the configuration of FIGS. 1-4B, each engaging member 115 comprises a saddle 115a which is V-shaped, and the engaging surfaces 120 of each of the saddles 115a preferably comprises a polymer or a foam, such as Delrin™ polymer available from DuPont de Nemours, Inc. The V-shape of the saddles 115a may enable the cart 100 to safely accommodate parts of different sizes, such as cylindrical shafts 500 of different diameters, as long as corresponding portions of the shaft 500 to be carried can be supported by the saddles 115a.

Figure 4C:
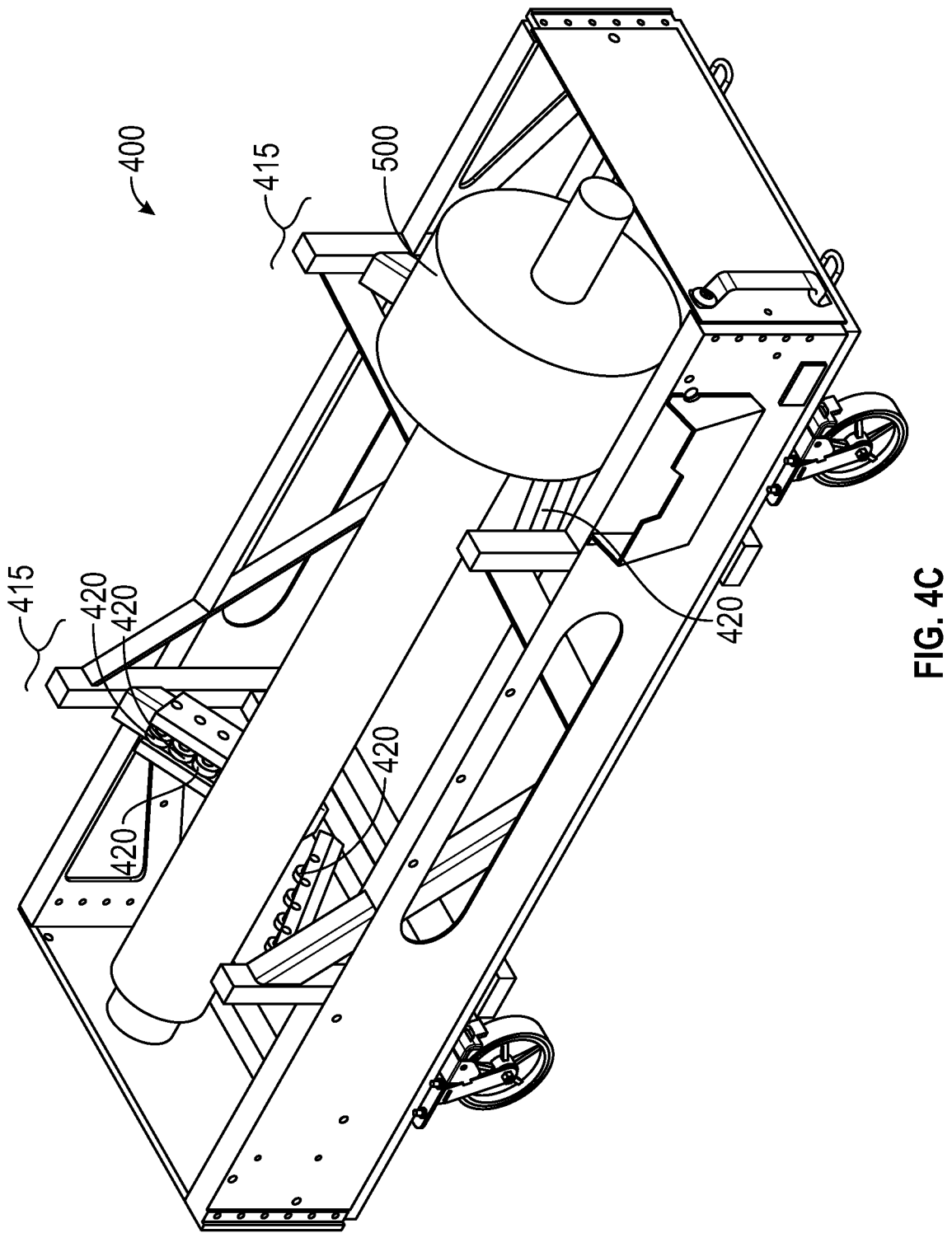
FIGS. 4C-4E are perspective, side, and top views, respectively, of a material handling cart according to further aspects of an embodiment of the invention.
Figure 4D:
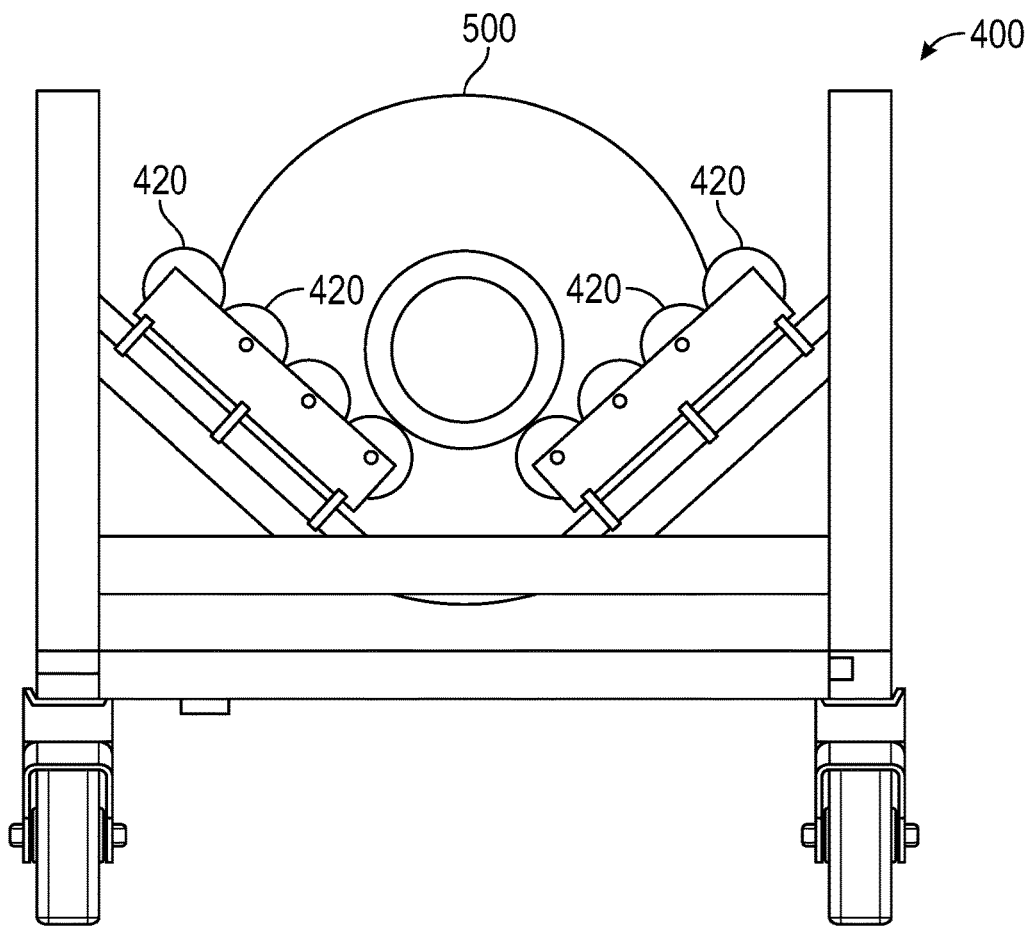
Figure 4E:
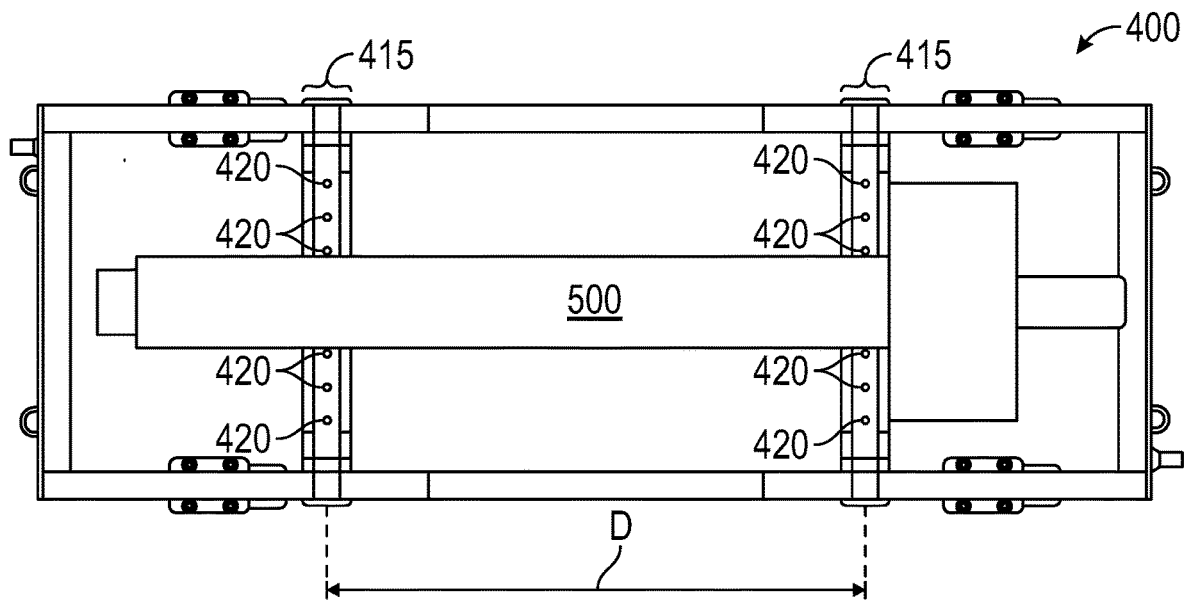

According to the exemplary configuration shown in FIGS. 4C-4E, instead of polymer or foam engaging surfaces 120, a cart 400 may have engaging members 415 each comprising one or more opposing pairs of rollers, such as wheels 420, on which a cylindrical shaft portion of the part 500 rests. In the example of FIGS. 4C-4E, each engaging member 415 of cart 400 has four pairs of wheels 420, and engaging members 415 are separated by a distance D of three to four feet. As a result, the part 500 is rotatable when the part 500 is carried by the cart 400, enabling careful inspection of the part 500, painting of the part 500, etc. Wheels 420 may comprise conventional wheels; e.g., similar to caster wheels 110, but having a relatively soft, non-marking tread for contacting the part 500 without damaging its finish. Exemplary wheels include those having rubber, polyurethane, or polyolefin treads and an appropriate load rating, available from Colson Casters of Jonesboro, Ak., USA. Cart 400 can be otherwise similar to cart 100.

In the exemplary configuration shown in FIGS. 6A-8C, cart 200 may have engaging members 215 comprising saddles 215a, each having a shape substantially complementary to a corresponding portion of a part such as a shaft (not shown) to be carried by the cart 200. This structure limits the size and/or shape of the part that can be carried, but provides a greater surface area of the saddle 215a in contact with the part. Engaging members 215 also comprise engaging surfaces 220 comprising a polymer or foam similar to engaging surfaces 120 of cart 100, but conforming to the shape of saddles 215a.

It should be understood that a strap or harness can be used to further constrain a part within any of the carts described herein.

A further advantage of the disclosed cart is that a plurality of identical carts can easily be stacked. This enables a number of parts to be safely moved at once, as by rolling the stack of carts. Also, stacking carts saves storage space and increases manufacturing throughput in certain situations. As shown in FIGS. 1-5D, to enable a plurality of the carts 100 to be stacked, each cart 100 includes a plurality of upper supports 115b (which are also components of engaging members 115) attached to the frame 105 and extending upward from the frame 105. In this configuration, the upper supports 115b are each a steel tube welded to the frame 105 having a side support 125 that is also steel and welded to the frame. The saddles 115a are also attached to the upper supports 115b, as by welding. Each upper support 115b has a height equal to or greater than a height of the part 500 when the part 500 is carried by the cart 100. Each upper support 115b also has a tubular upper stacking coupler 130 at its distal end. In the configuration of FIGS. 1-5D, upper stacking couplers 130 are each an extension of one of the tubular upper supports 115b, and has a cap 130a on its end.

Figure 2:
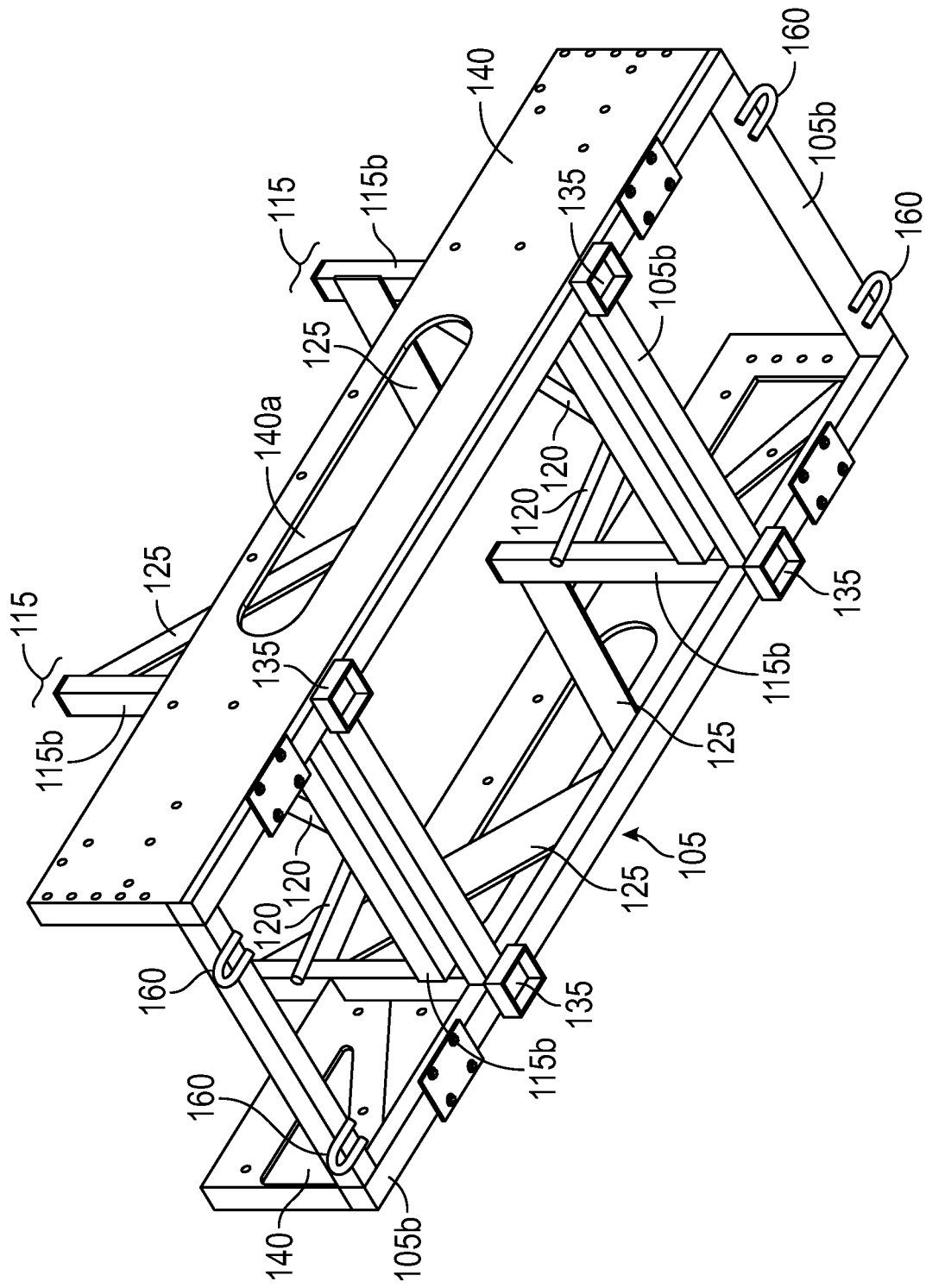
FIG. 2 is a partial perspective view from below of the material handling cart depicted in FIG. 1.

As best seen in FIG. 2, a plurality of lower stacking couplers 135 are attached to the lower surface 105b of the frame 105, as by welding. Lower stacking couplers 135 are tubular, and larger in cross-section than the upper stacking couplers 130, such that upper stacking couplers 130 fit into lower stacking couplers 135. Thus, as shown in FIGS. 5A-D, the lower stacking couplers 135 of the cart 100 engage upper stacking couplers of a second material handling cart 100a identical to the cart 100, to stack the cart 100 above the second cart 100a. Likewise, the upper stacking couplers 130 of the cart 100 engage lower stacking couplers 135 of a third material handling cart 100b identical to the cart 100, to stack the third material handling cart 100b above the cart 100. A fourth cart 100c can also be stacked above third material handing cart 100b.

Figure 7A:
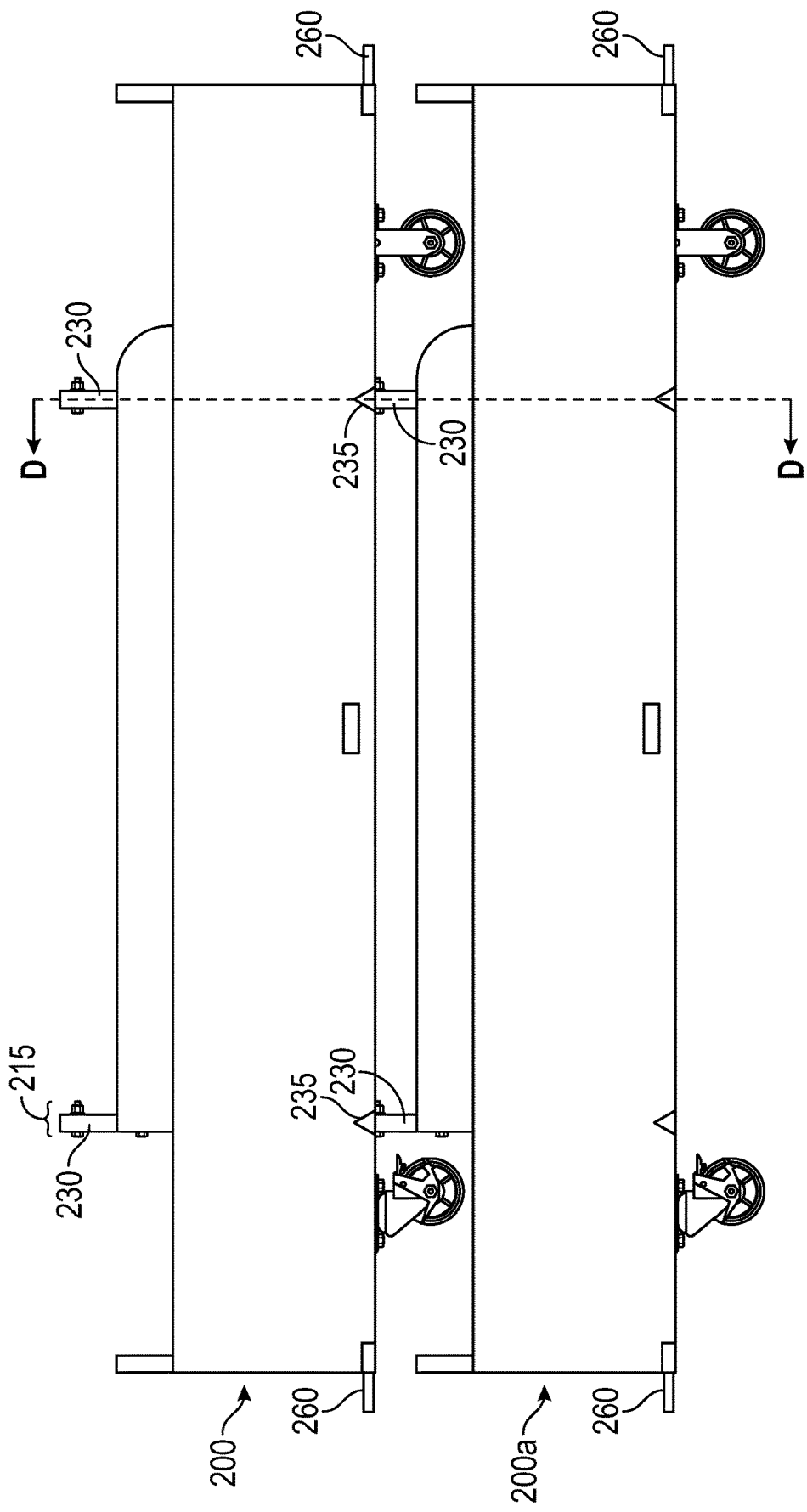
FIG. 7A is a side view of several examples of the material handling cart depicted in FIG. 6A stacked on top of each other.
Figure 8A:
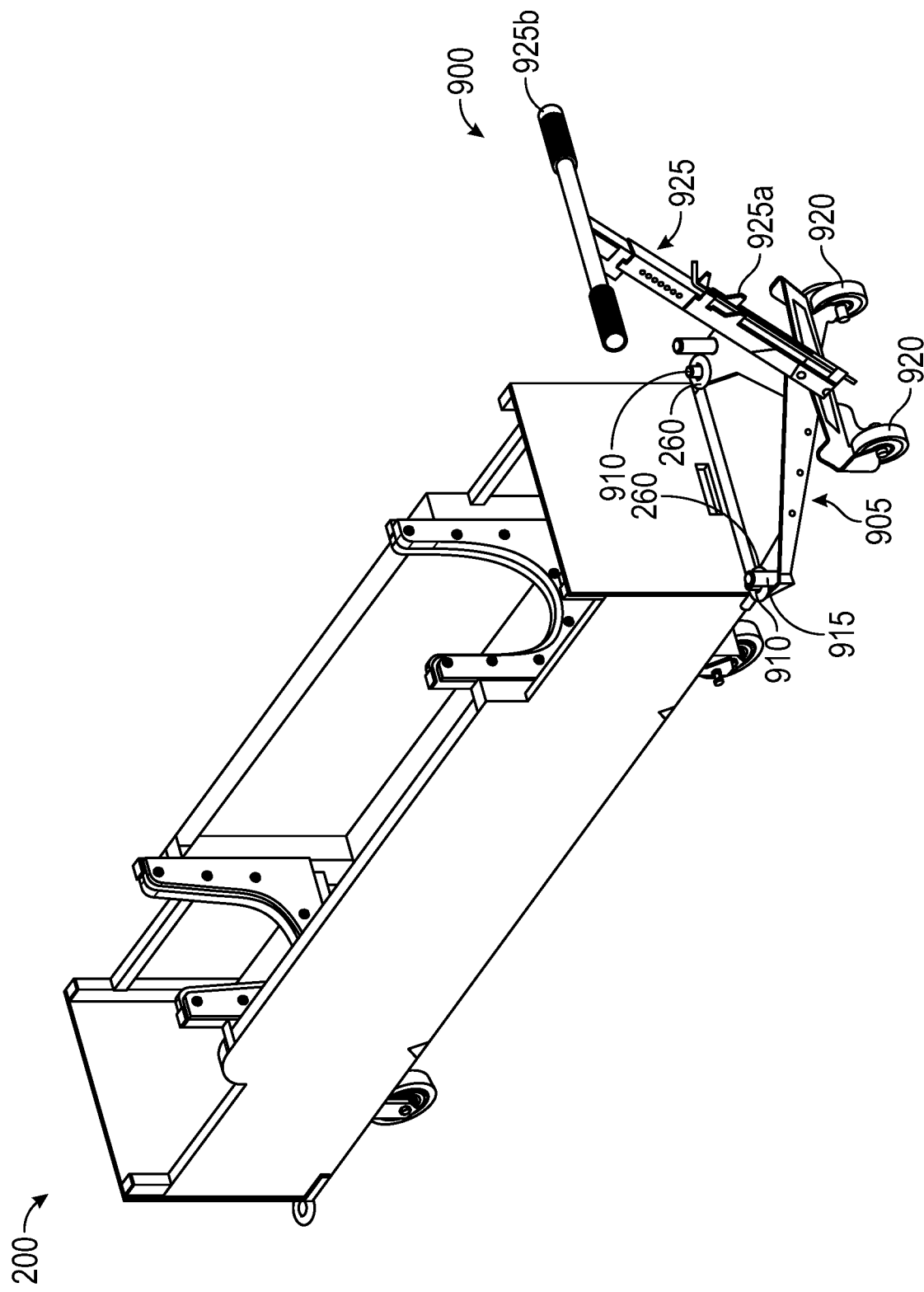
FIG. 8A is a perspective view from above of the material handling cart depicted in FIG. 7A with a pusher attached.
Figure 8B:
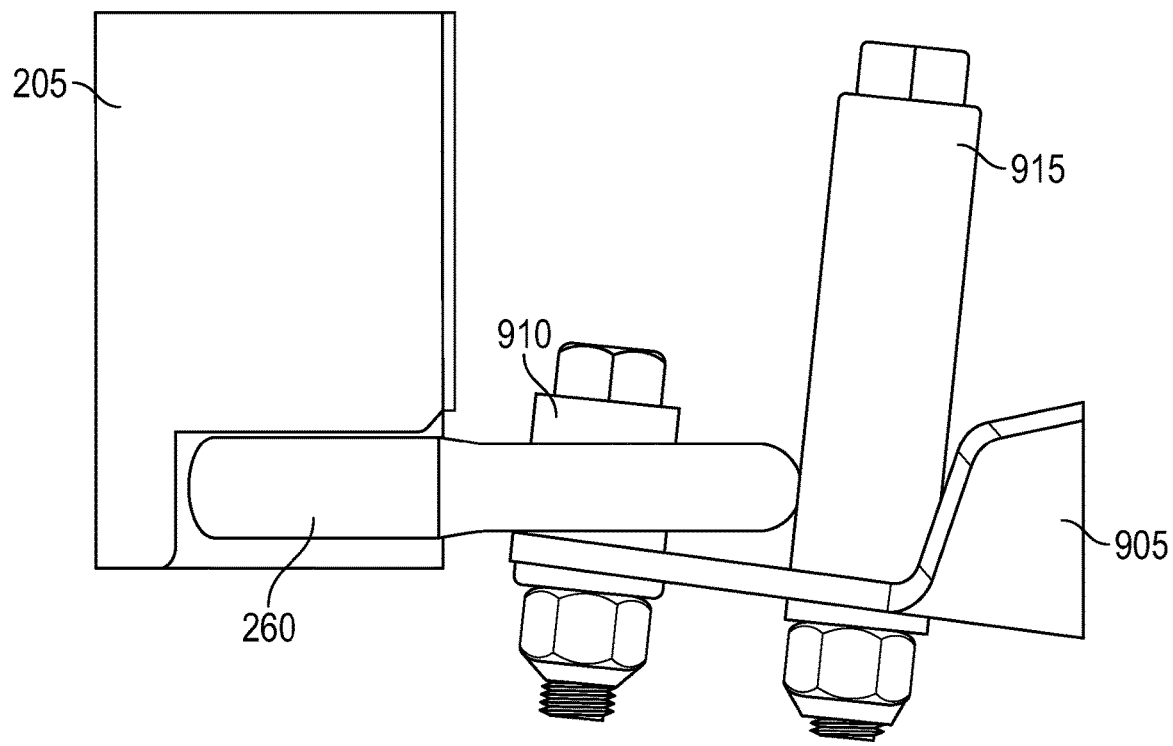
FIG. 8B is a detail view of the connection between the material handling cart and pusher depicted in FIG. 8A.
Figure 8C:
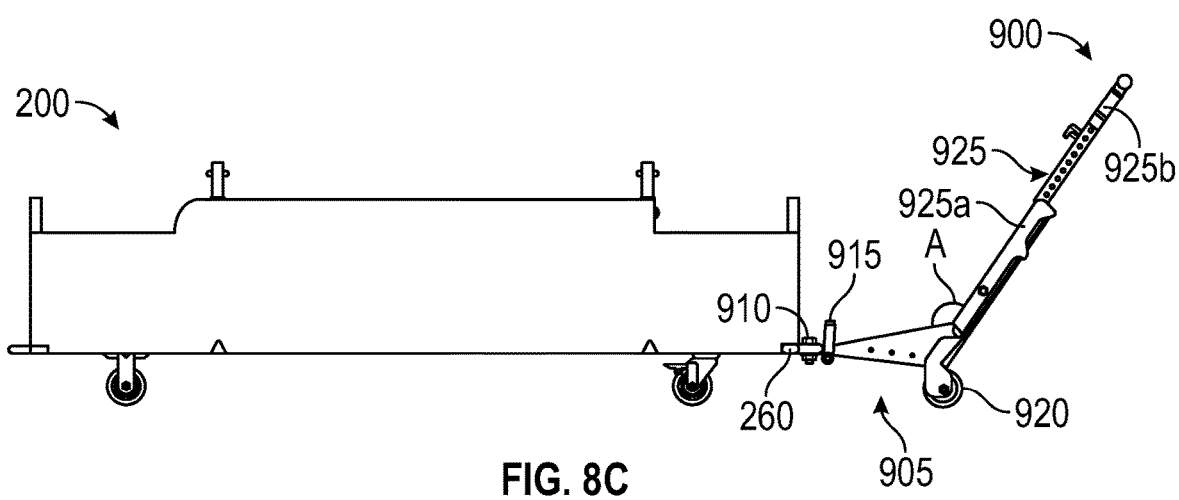
FIG. 8C is a side view of the material handling cart with the pusher depicted in FIG. 8A.

In the exemplary configuration shown in FIGS. 6A-7C, each of the engaging members 215 and a pair of upper supports 215b are unitary (i.e., combined into one piece), and the engaging surface 220 of each engaging member 215 extends onto the pair of upper supports 215b. Thus, the entire saddle 215a and inner portions of the upper supports 215b are covered with the material of the engaging member 220 to protect the part from damage. As shown in FIGS. 7A-C, the identical carts 200, 200a of this configuration stack in a similar fashion to the carts 100 and 100a-c of FIGS. 5A-D. Upper stacking couplers 230 are disposed at the distal ends of the upper supports 215b, and fit into lower stacking couplers 235 having a complementary shape to the ends of the unitary engaging members/upper supports 215/215b.

Referring again to FIGS. 1-5A, cart 100 may further comprise a plurality of side walls 140 and one or more doors 145, such as steel walls and doors, attached to and extending upward from the frame 105 and surrounding the part 500 when the part 500 is carried by the cart 100. The walls 140 and door(s) 145 provide protection for the part 500. Side walls 140 can include openings 140a located and sized such that a user walking by a stack of carts 100-100c (as shown in FIG. 5A) is able to easily see whether or not each of the carts is carrying a part 500. In certain configurations, the one or more doors 145 are movable from a closed position as shown in FIG. 4A, to an open position as shown in FIG. 4B, to provide access to the part 500 (e.g., for inspection of the part 500) when the part 500 is carried by the cart 100. As shown in FIGS. 1, 4A, and 4B, each door 145 has a hinge 150. A magnet 155 or other closure can be provided to hold the door 145 shut. As shown in FIGS. 6A-B, cart 200 also has a set of side walls 240.

A pair of eye bolts or U-bolts 160 (or in other embodiments a pair of hooks) is attached to the lower surface 105b of the frame 105, for pulling the cart 100 by a forklift, or for attaching the cart 100 to another cart, as by chains, and pulling the chained-together carts in a train. Cart 200 of FIGS. 6A-8C also has pairs of eye bolts or U-bolts 260 for the same purpose.

In certain configurations, cart 100 further includes one or more pockets 165 to hold tools, paperwork, and/or other component(s) associated with the part 500. In these embodiments, cart 100 is a "kit cart" that may carry together and organize all associated elements (i.e., parts, tools, and components). This is advantageous in certain industries, such as the aerospace industry, where elements that need to be assembled to each other may be lost if they are not kept together, thereby causing manufacturing and/or shipping delays.

In certain configurations, cart 100 comprises a conventional radio frequency identification (RFID) tag 170 attached to it. RFID tag 170 can be part of a system for tracking the location of cart 100.

In further configurations shown in FIGS. 3A-B, 8A-C, 9A-E, 10-11C and 16-17D, carts as described herein may each be configuration for engagement with a pusher 900 for facilitating moving of the cart within a facility. Carts 100, 200, 400, 600, and 800, and pusher 900, may be removably attachable to each other as needed. According to these embodiments, at least one of the sides of the cart frame 105, 205, 605, and 805 has a pair of spaced-apart first pusher attachments, such as the U-bolts 160, 260 or a pair of holes (not shown) in the frame 105, 205. The pusher 900 comprises a base 905 having a proximal end including a pair of second pusher attachments, each comprising a pin 910 to engage one of the first pusher attachments 160, 260 to movably attach the pusher base 905 to the cart frame 105, 205. The pins 910 extend upwards from the pusher base 905, and are sized to fit within the corresponding first pusher attachment U-bolt 160, 260 or frame hole. A second pin 915 attached to base 905 also contacts the first pusher attachments 160, 260 to stabilize the connection between pusher 900 and cart 100, 200. The pusher base 905 also has a distal end including a pair of wheels 920 mounted to roll along a longitudinal axis L of the base 905 running from its proximal end to the distal end.

The pusher 900 further comprises a handle 925 extending upward from the distal end of the base 905 at an obtuse angle A to the longitudinal axis L of the base 905, such that when the pusher base 905 is attached to the cart frame 105, 205, a user moves the cart 100, 200 by applying a pushing force on the handle 925. The handle 925 is T-shaped and comprises a handle body 925a attached to the pusher base 905, and a handle bar 925b attached to the handle body 925a substantially perpendicular to the handle body 925a. The handle bar 925b is gripped by the user when the user applies the pushing force to the handle 925.

An important advantage of the cart/pusher combinations described herein, such as the combination of cart 100 and pusher 900, is that a low pushing or pulling force is required to move a loaded cart, thereby making it safer for the user. Those of skill in the art will understand that a cart/pusher combination can be designed so that it meets OSHA (Occupational Health and Safety Administration) standards. For example, by selecting appropriately scaled high-quality caster wheels to support the weight of the loaded cart, along with compatible wheels for the pusher, a push/pull force of about 30 pounds is achievable.

Figure 9B:
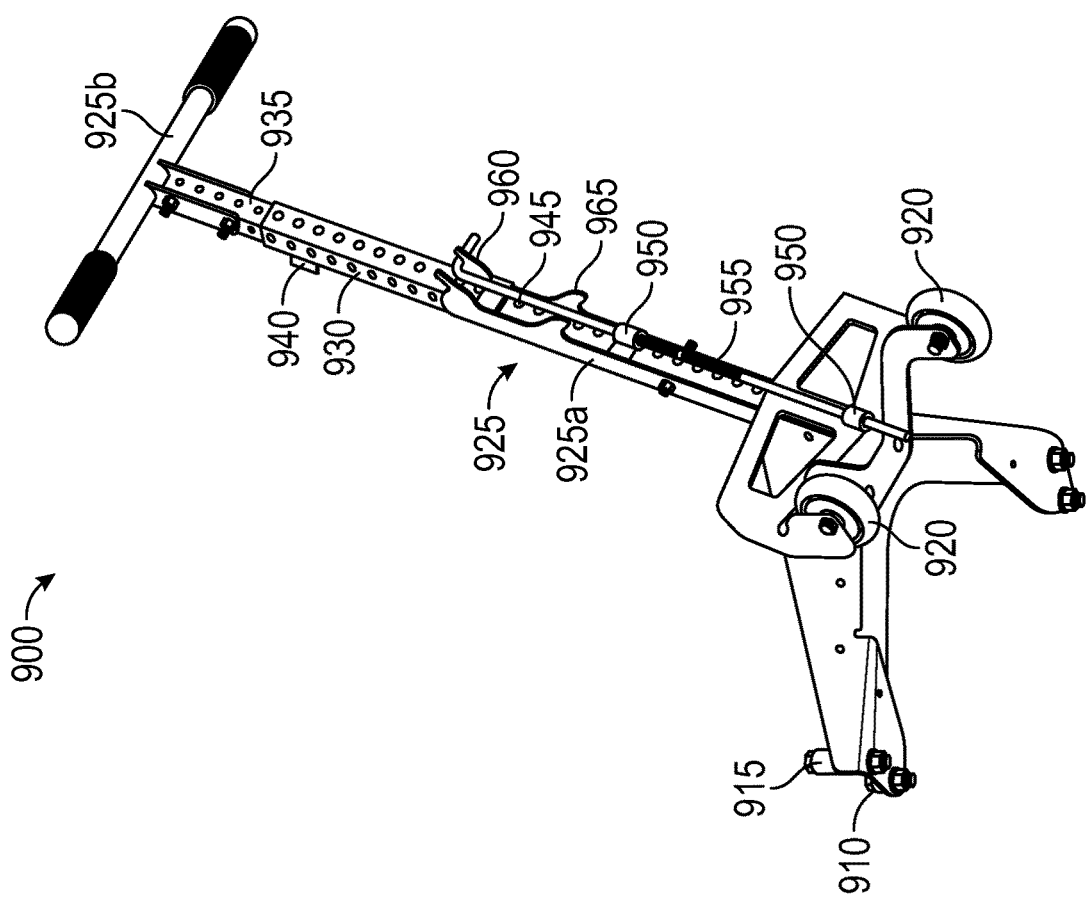
FIGS. 9A and 9B are top and bottom perspective views, respectively, of a pusher usable with the material handling carts disclosed herein, in accordance with further aspects of an embodiment of the invention.
Figure 9A:
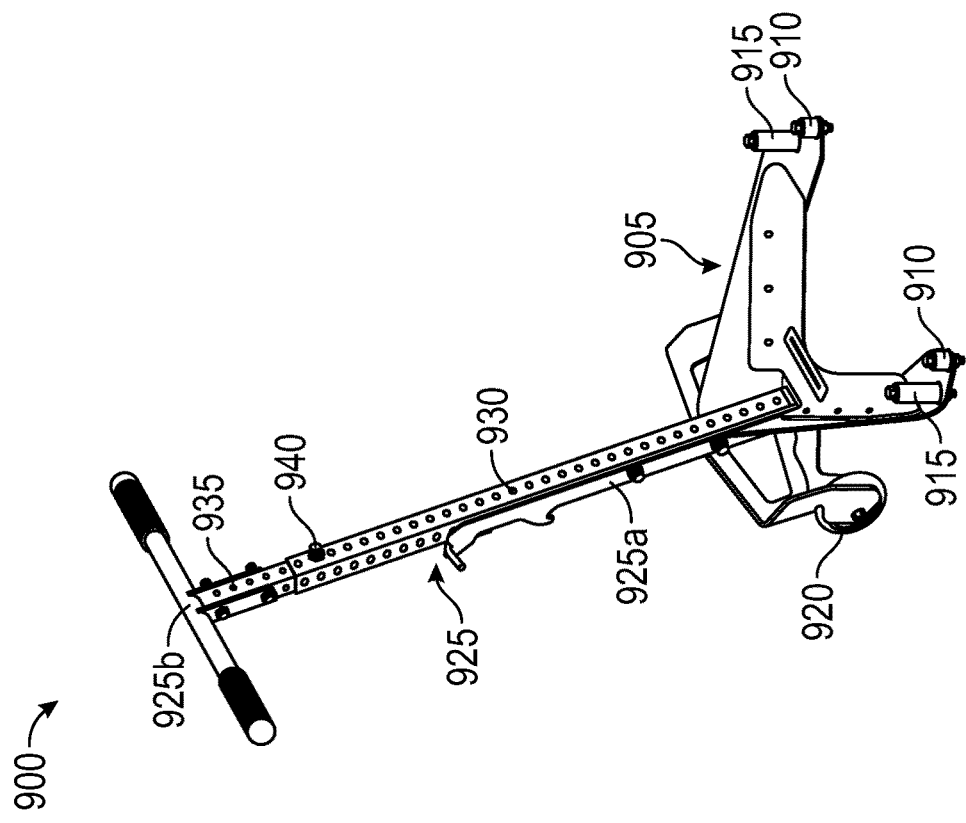

As best seen in FIGS. 9A-E, the handle body 925a comprises a lower tube 930 attached to the pusher base 905, an upper tube 935 that slidably fits inside the lower tube 930, and an adjuster 940, such as a pin or a plunger that extends through holes in the upper and lower tubes 930, 935, to maintain the relative positions of the lower and upper tubes 930, 935 such that the height of the handle 925 is adjustable. For example, FIGS. 9C and 9D show the handle 925 at two extremes of adjustment depending on how upper tube 935 is positioned within lower tube 930. The handle bar 925b is attached to the upper tube 935 substantially perpendicular to the upper tube 935.

Figure 9E:
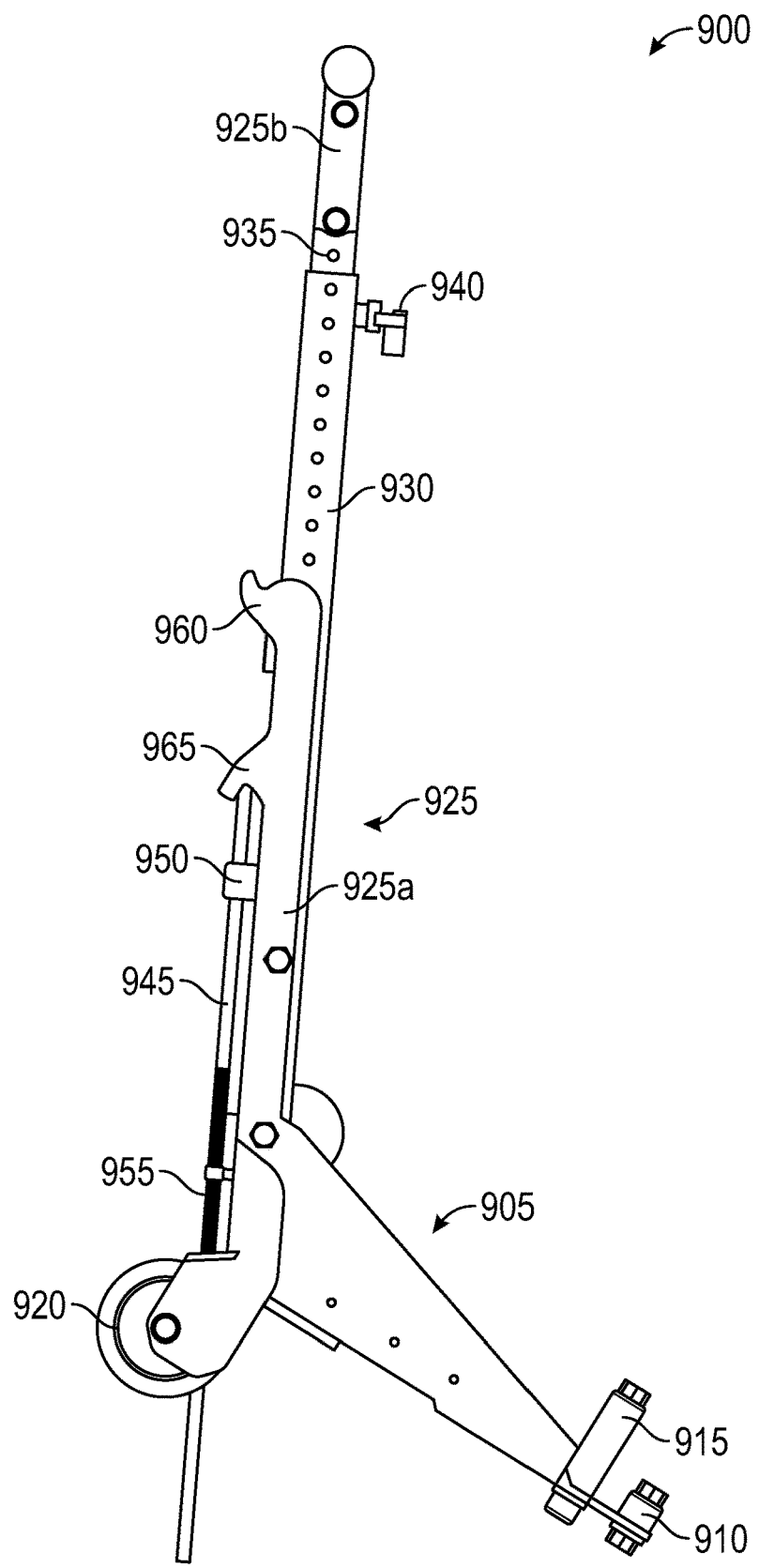
Figure 10:
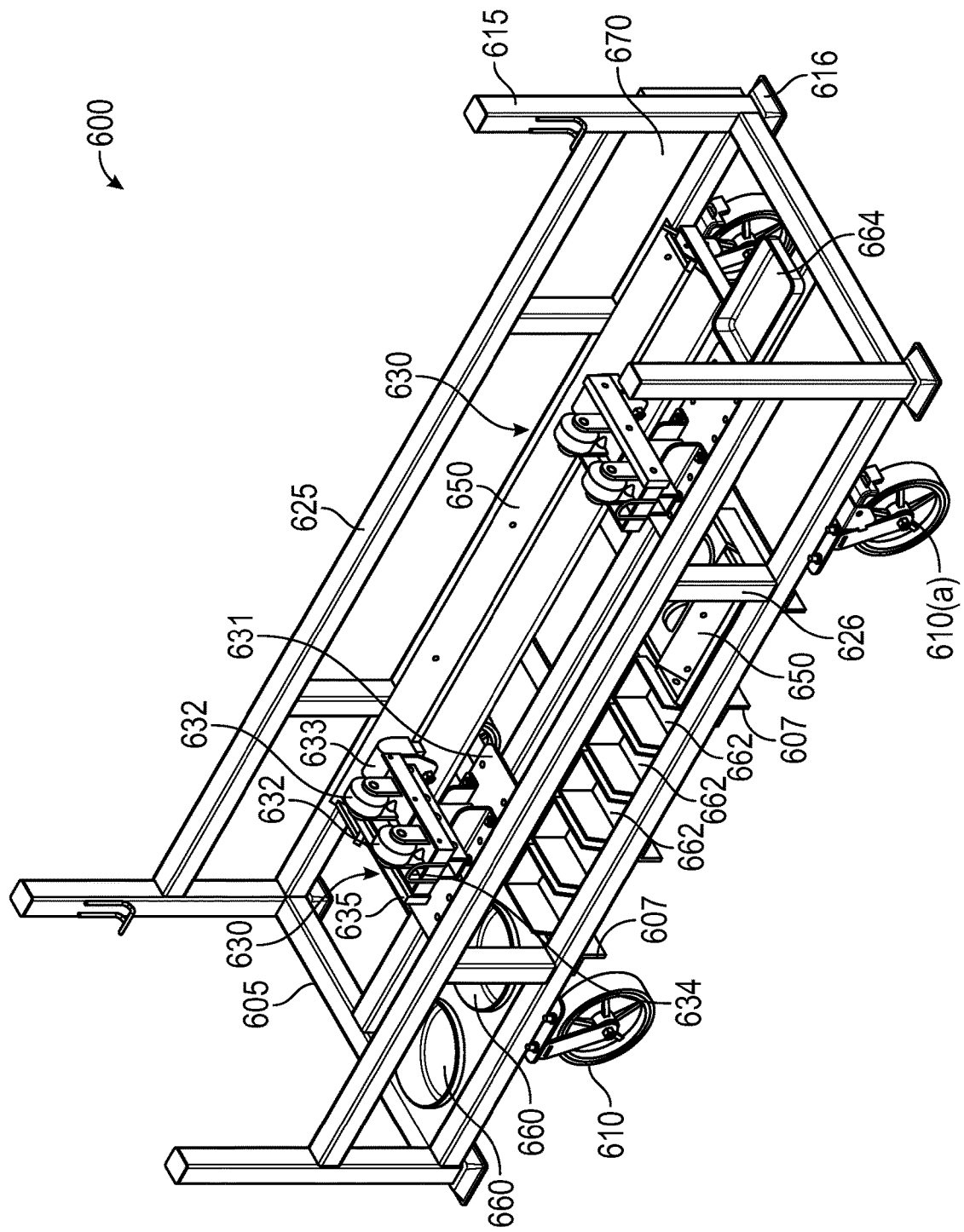
FIG. 10 is a top perspective view of a material handling cart according to further aspects of an embodiment of the invention.
Figure 12C:
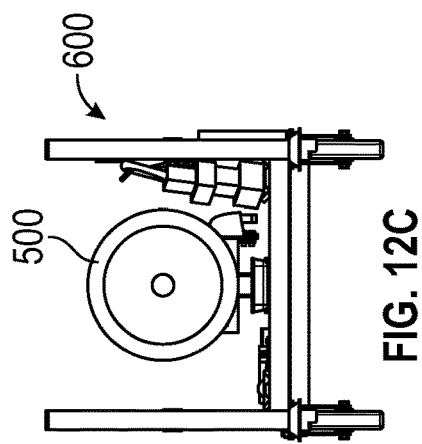
FIG. 12C is an end view of the material handling cart of FIG. 10 with a part positioned thereon.
Figure 12D:
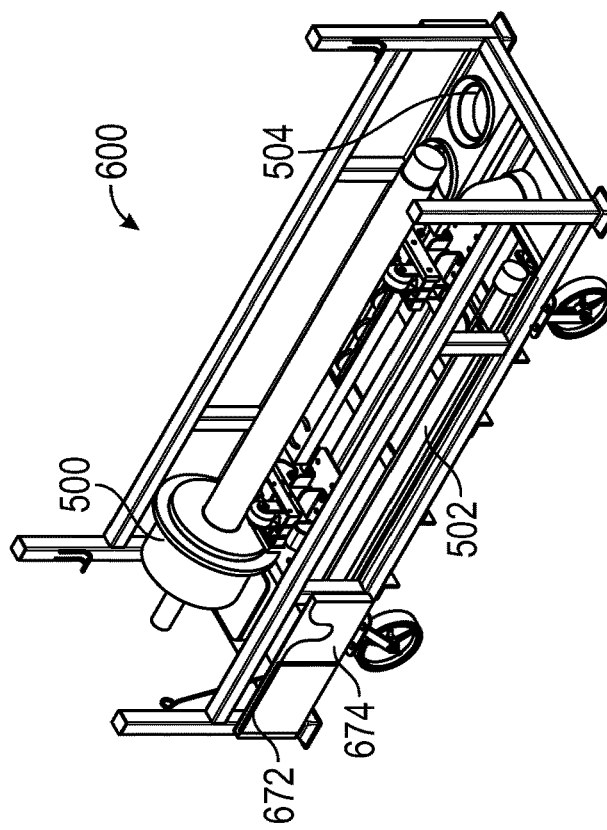
FIG. 12D is a top perspective view of the material handling cart of FIG. 10 with a part positioned thereon.
Figure 12A:
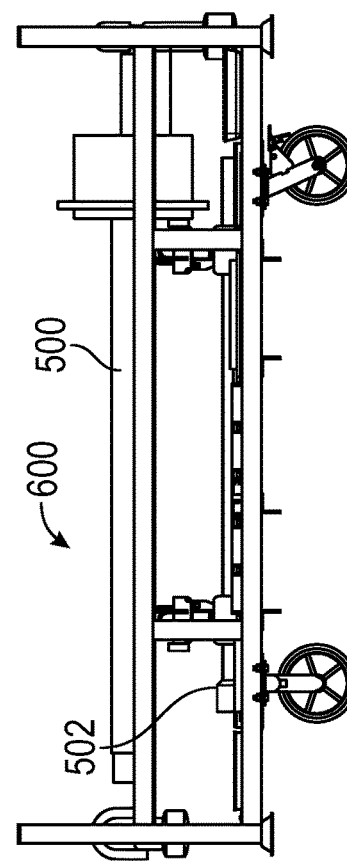
FIG. 12A is a side view of the material handling cart of FIG. 10 with a part positioned thereon.
Figure 12B:
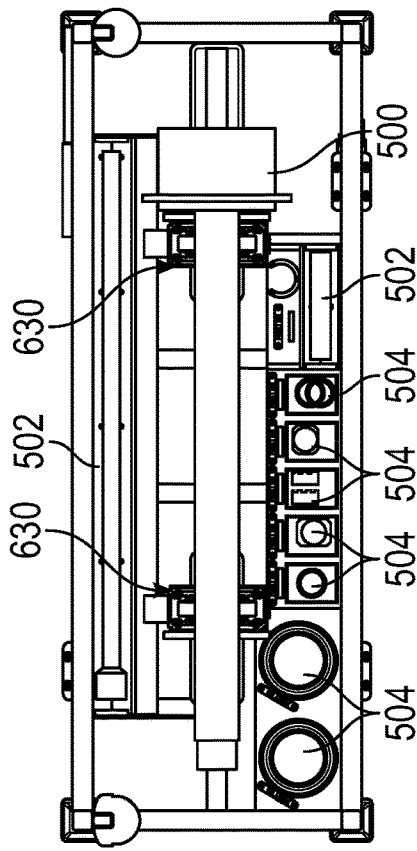
FIG. 12B is a top view of the material handling cart of FIG. 10 with a part positioned thereon.
Figures 13A, 13B:
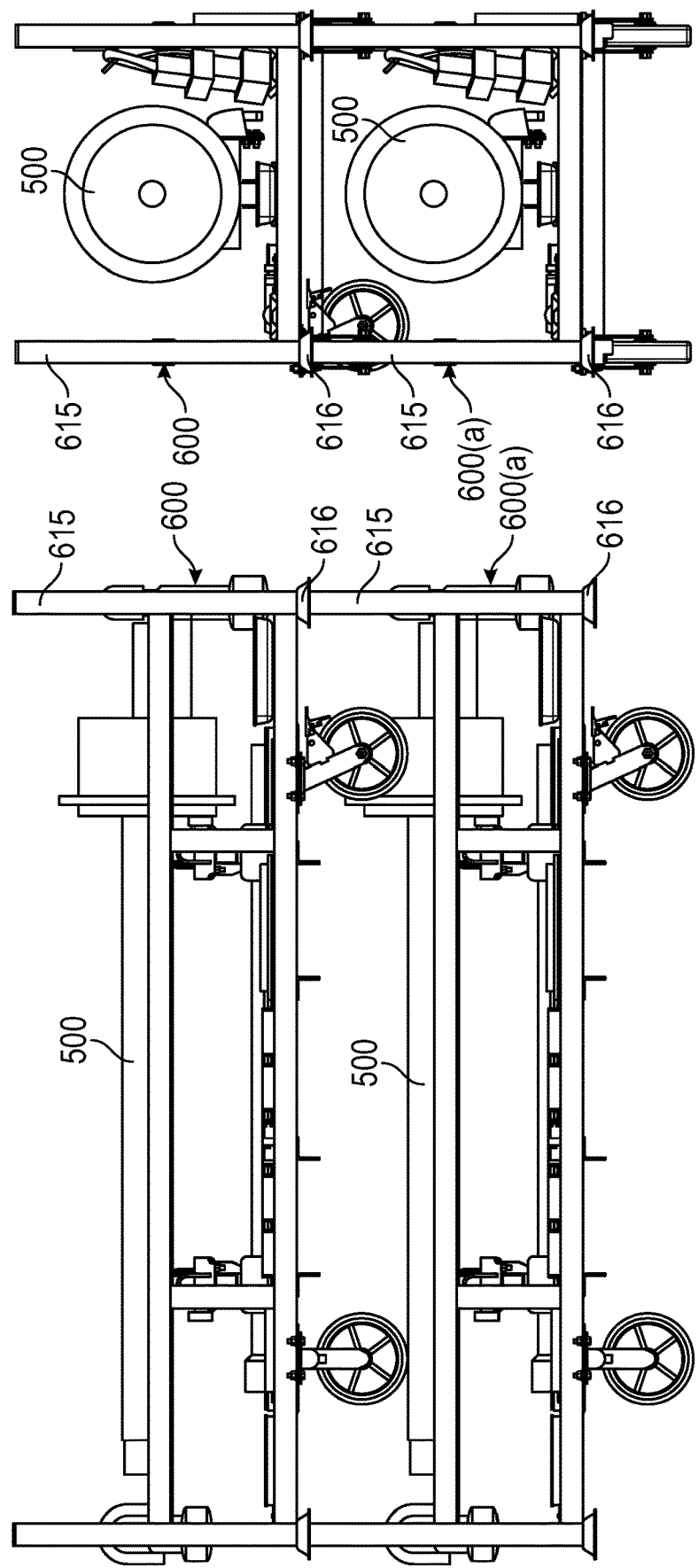
FIG. 13A is a side view of multiple material handling carts of FIG. 10 stacked on top of one another.
FIG. 13B is an end view of the stacked material handling carts of FIG. 13A.
Figure 14A:
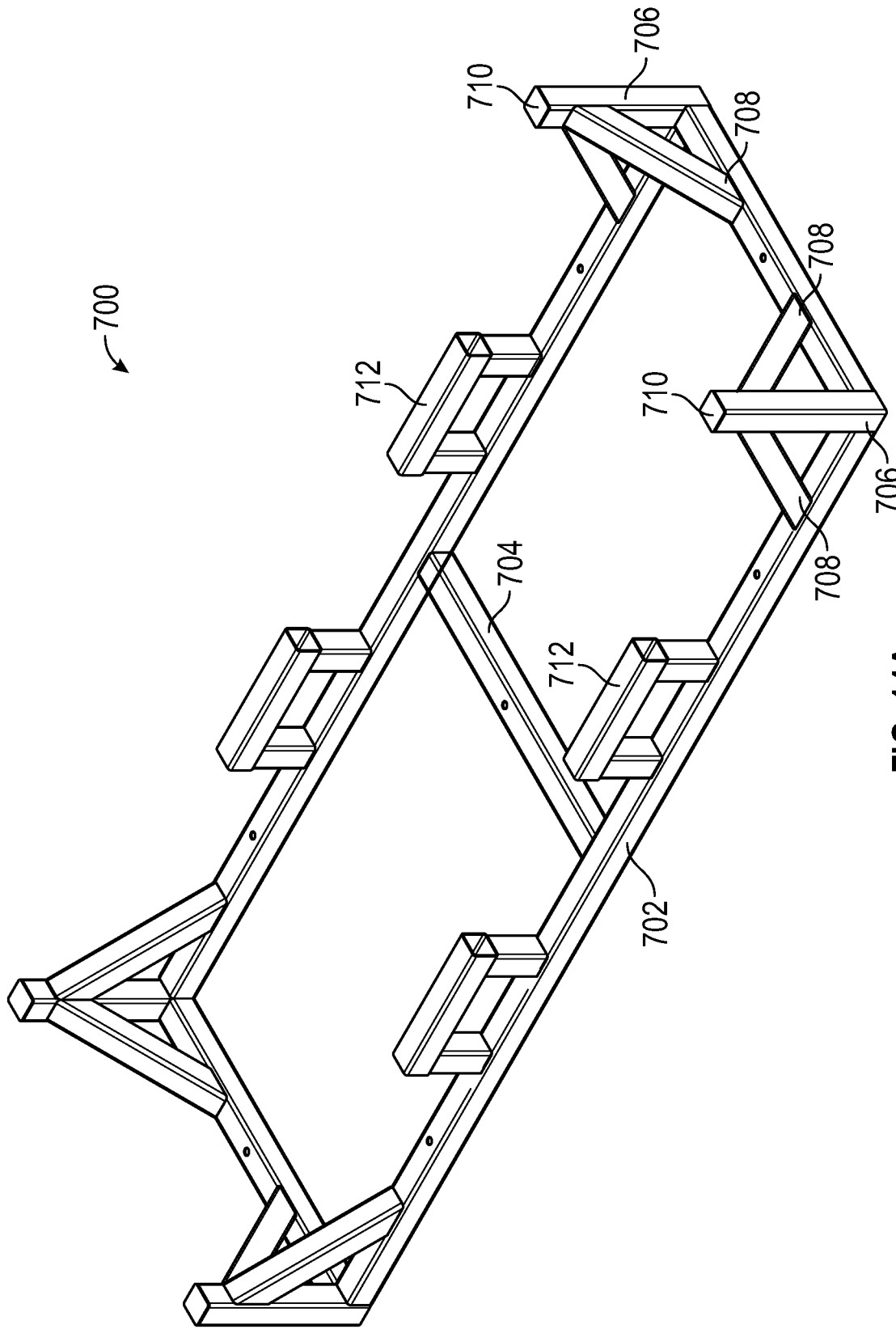
FIG. 14A is a top perspective view of a cart stacking base according to further aspects of an embodiment of the invention.
Figure 17C:
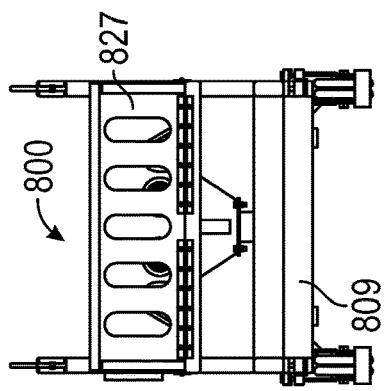
FIG. 17C is an end view of the material handling cart of FIG. 16A.
Figure 17D:
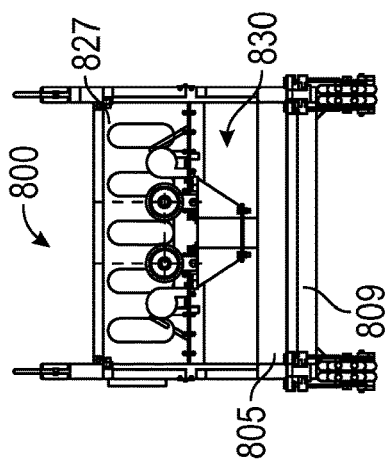
FIG. 17D is a cross-sectional view of the material handling cart of FIG. 16A along section line A-A of FIG. 17B.
Figure 17A:
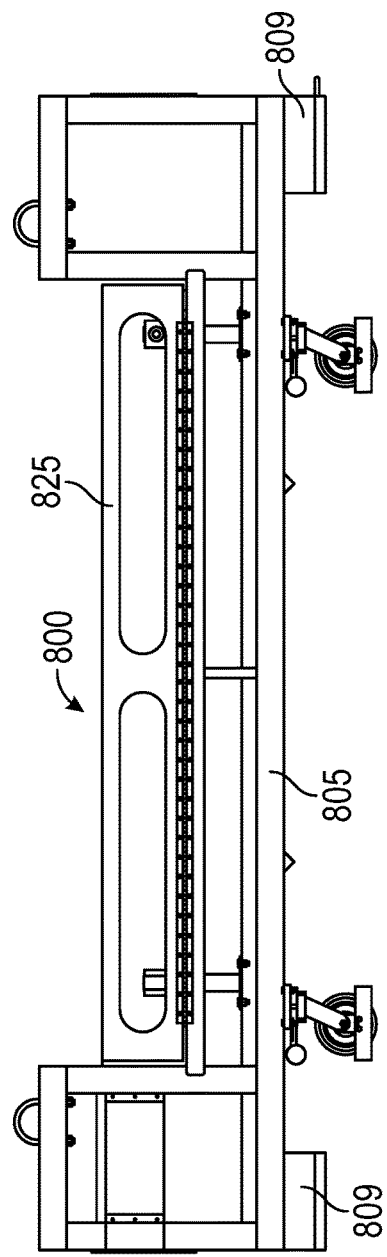
FIG. 17A is a side view of the material handling cart of FIG. 16B.
Figure 17B:
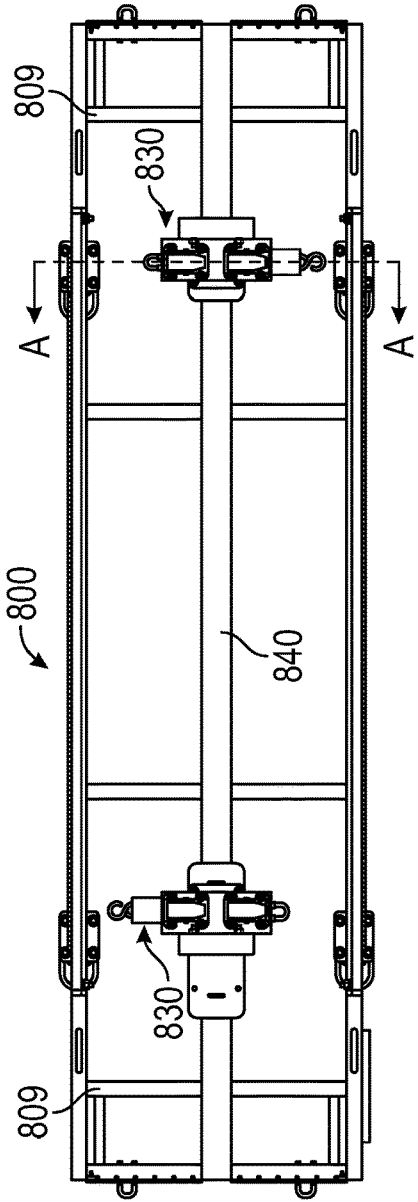
FIG. 17B is a top view of the material handling cart of FIG. 16A.
Figure 18A:
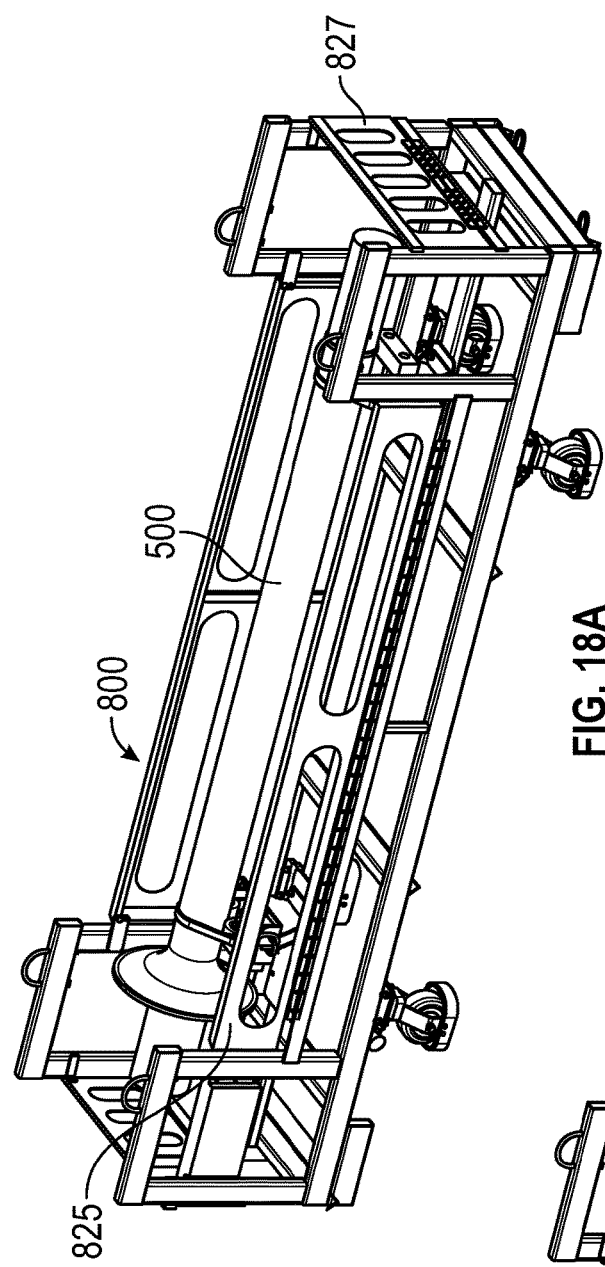
FIG. 18A is a perspective view of the material handling cart of FIG. 16A with a part positioned thereon and with side walls and end walls in a closed orientation.
Figure 18B:
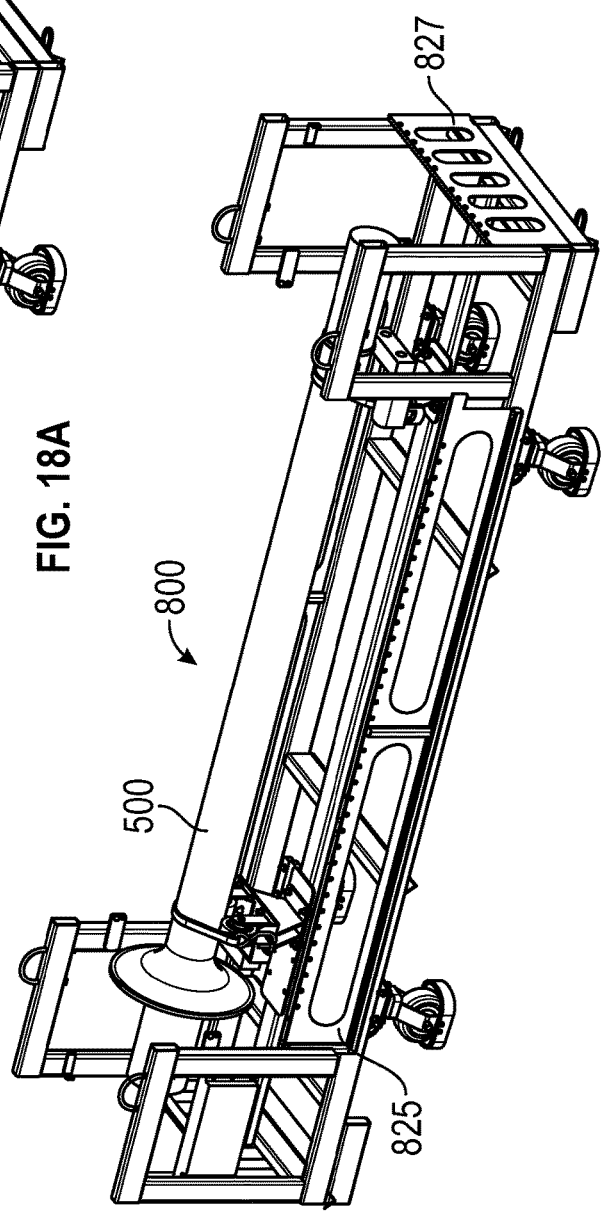
FIG. 18B is a perspective view of the material handling cart of FIG. 16A with a part positioned thereon and with side walls and end walls in an open orientation.

Pusher 900 also includes a stand 945, such as a wire stand, movable from a retracted position shown in FIGS. 9B to 9D, to an extended position shown in FIG. 9E, thereby enabling pusher 900 to stand up and rest on its base 905 when not in use. Stand 945 is slidably mounted by guides 950, and is biased by a spring 955 between the retracted position where the top of stand 945 engages an upper hook 960 of handle body 925a, and the extended position where the top of stand 945 engages a lower hook 965 of handle body 925a.

Next and in accordance with further aspects of an embodiment of the invention, FIGS. 10-13B show a material handling cart 600 incorporating several of the features discussed above, in addition to further features. With regard to the particular configuration reflected in FIGS. 10-13B, material handling cart 600 includes a frame 605 that is supported by caster wheels, such as by way of non-limiting example rigid caster wheels 610 and swivel caster wheels 610(a). Providing both rigid or locked caster wheels 610 and swivel caster wheels 610(a) may aid a user in performing an inspection of shaft or component 500 without excessive or undesirable movement of cart 600 during such inspection. Frame 605 includes upper supports 615 and side supports 625. Upper supports 615 are in this exemplary configuration positioned at each corner of frame 605, with each including a stacking receiver 616 at the bottom of upper supports 615. Stacking receivers 616 are configured to receive the top of an upper support 615 of a similarly configured second cart 600(a) (FIGS. 13A and 13B), thus enabling the stacking of multiple carts 600 for ease of transport.

Side supports 625 are positioned above frame 605 by side upright supports 626. Thus, the sides of cart 600 comprise the generally open assembly of frame 605 at the bottom, side support 625 at the top, vertical upper supports 615 at the ends, and intermediate side upright supports 626. This configuration provides maximum visibility of and access to a component 500 stored on cart 600, thus further easing the inspection of such components, even in the case of multiple, stacked carts 600, but while maintaining sufficient rigid structure to protect the component against damage from the sides. Likewise, each end of cart 600 is preferably open, and is thus defined solely by frame 605 at the bottom and vertical upper supports 615 at its sides, in turn easing the loading and unloading of component 500 onto and off of cart 600.

The bottom of frame 605 may include forklift guides 607 configured to receive a forklift for easy lifting, transporting, and stacking of cart 600.

To support component 500 in cart 600, the engaging members that engage component 500 may comprise roller support trolleys 630 having rollers 632 (of similar construction to rollers 420 discussed above) that contact component 500 and allow for its rotation about the longitudinal axis of cart 600 for inspection. Each support trolley 630 includes a trolley rail mounting plate 631 that, in turn, is mounted to trolley rail 640. Preferably, each roller support trolley 630 is adjustably mounted to trolley rail 640 such that its longitudinal position along cart 600 may be modified to support shafts 500, or other components, having varied configurations. For example, each trolley rail mounting plate 631 may be configured to slide along trolley rail 640, and when at a desired position appropriate for supporting a component 500, may be locked in place so that rollers 632 will contact the component 500 at the intended locations along component 500.

Each roller support trolley 630 preferably includes a strap 633 mounted to the side of the roller support trolley 630 and extendable over roller support trolley 630 (and over the top of a component 500 mounted in cart 600). The end of each strap 633 may include a hook configured to engage a strap loop 634, after which a ratchet mechanism of standard configuration may be used to tighten strap 633 down against component 500, thus securely holding component 500 on cart 600. Each roller support trolley 630 also preferably includes a bumper 635 extending laterally across an outer wall of each roller support trolley 630. Each bumper 635 may be formed of a material that is sufficiently non-rigid so as to cushion a lateral face of component 500 when positioned against roller support trolley 630, such as plastic, rubber, or such other non-rigid materials as may occur to those skilled in the art, so as to avoid damage to component 500 as it is being positioned on and removed from cart 600. With bumpers 635 positioned on each roller support trolley 630 on its outer lateral face, component 500 may be positioned with either end of component 500 closest to either end of cart 600 while ensuring cushioned lateral support of critical lateral faces of component 500, thus allowing component 500 to be loaded onto cart 600 from either end of cart 600.

Likewise, sheets or panels 650 of like material may be positioned along cart 600 and supported within frame 605 using any conventional attachment devices, which non-rigid panels 650 may hold additional elongate parts, tools, or components 502 (best seen in FIG. 12B) that are associated with component 500 and with sufficient cushioning so as to avoid risk of damage to such additional elongate parts, tools, or components 502. Still further, storage devices, including storage pans 660 and storage bins 662, may be provided and positioned along cart 600 and supported within frame 605 using any conventional attachment devices, and which storage pans 660 and storage bins 662 may similarly hold smaller parts, tools, or components 504 that are associated with component 500. As with panels 650, storage pans 660 and storage bins 662 may be formed of a similar non-rigid material, such as plastic, so as to avoid risk of damage to such smaller parts, tools, or components 504. Preferably, each sheet or panel 650, storage pan 660, and storage bin 662 is sized and shaped so as to be complementary to, and thus to particularly receive and provide a designated storage location for, a specific part, tool, or component 502/504 that is associated with component 500. Preferably, an identification plate 663 is provided adjacent storage bins 662 so as to enable each storage bin to be labeled with an intended part that is to be stored in each respective bin. Similarly, each of panels 650 and storage pans 660 may similarly be labeled to reflect the particular part that is to be stored on each panel 650 and in each storage pan 660. Repositionable placeholder discs or coins 665, which may be formed by way of non-limiting example as resin discs, may be removably held in coin receivers adjacent one or more of panels 650, storage pans 660, and storage bins 662, and may be placed on panel 650, storage pan 660, or storage bin 662 if the actual component that is intended to be stored therein is absent or missing, such as a damaged part that has been removed for replacement, in order to properly keep track of all such components.

A magnetic storage tray 664 may additionally be provided and affixed to trolley rail 640, which magnetic tray 664 is preferably magnetized to capture and hold screws, fasteners, and similar small metal pieces associated with component 500 to ensure that they are not misplaced or lost when removed from component 500 (or any other of the foregoing elements).

Optionally, cart 600 may also include a white board 672 and paperwork holder 674 that are affixed to frame 605. Each of white board 672 and paperwork holder 674 are positioned for access and viewing from a side of cart 600. Thus and by way of non-limiting example, messages relating to component 500 (such as its current intended status, next processing action, etc.) may be written on white board 672 for easy viewing by persons in a facility using carts 600 for transport and storage of components 500, and paperwork associated with component 500 may be readily accessed from paperwork holder 674. Each of white board 672 and paperwork holder 674 may be affixed to a mounting plate 670 that in turn may be fixed to a side of cart 600.

Next and with reference to FIGS. 14A-15B and in accordance with further aspects of the invention, a cart stacking frame (shown generally at 700) may additionally be provided to aid in stacking multiple carts as described above. Cart stacking frame 700 may include a rectangular base frame 702, a base frame cross member 704, and base vertical stacking members 706. Preferably, base angle members 708 may be provided between base frame 702 and each base vertical stacking member 706 to add support to each base vertical stacking member 706. A cap 710 may be provided at the top of each base vertical stacking member 706.

Cart stacking base 700 may also preferably include forklift receiver frames 712 mounted to a top side of base frame 702, which forklift receiver frames 712 are configured for engagement by a forklift for easy lifting and moving of cart stacking base 700 from place to place.

Base vertical stacking members 706 are preferably configured having a similar shape to, for example, upper supports 615 of cart 600, and thus are configured for positioning within a stacking receiver 616 of cart 600, such that a cart 600 may be stacked directly on top of cart stacking base 700. As best shown in FIGS. 15A and 15B, this allows multiple carts 600 to be stacked one atop the other, with the lowermost cart 600(*b*) stacked directly on top of cart stacking base 700, cart 600 stacked directly above lowermost cart 600(*b*), upper cart 600(*a*) stacked directly above cart 600, and so on.

Next and in accordance with still further aspects of an embodiment of the invention, FIGS. 16A-19B show a material handling cart 800 incorporating many of the features discussed above, in addition to further features. With regard to the particular configuration reflected in FIGS. 16A-19B, material handling cart 800 includes a frame 805 that is supported by caster wheels, such as by way of non-limiting example swivel caster wheels 810, at least two of which are preferably swivel caster wheels. Each caster wheel 810 preferably includes a mounting arm 811 that rotatably mounts caster wheel 810, which mounting arm 811 is mounted to a caster mounting plate 812. Each caster mounting plate 812 is in turn mounted to a bottom side of frame 805. A guard ring 814 is mounted to the bottom of each mounting arm 811 and surrounds a portion of each caster wheel 810, but is positioned so that a bottom of each guard ring 814 is horizontally above the bottom of each caster wheel 810 so as to avoid interference between guard rings 814 and the floor. Guard rings 814 are thus configured to prevent having the cart inadvertently run over an obstacle, such as a person's foot that happens to be standing near cart 800 as it is being moved.

Figure 19B:
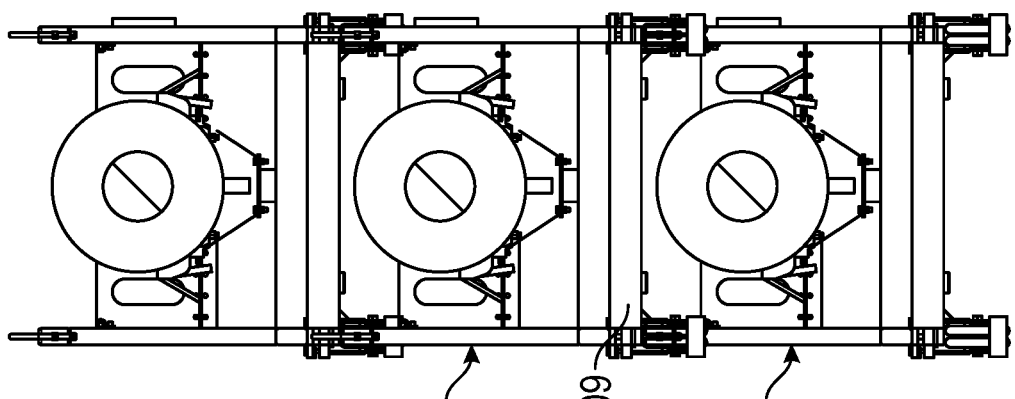
FIG. 19B is a cross-sectional view of the stacked material handling carts of FIG. 19A along section line M-M.
Figure 19A:
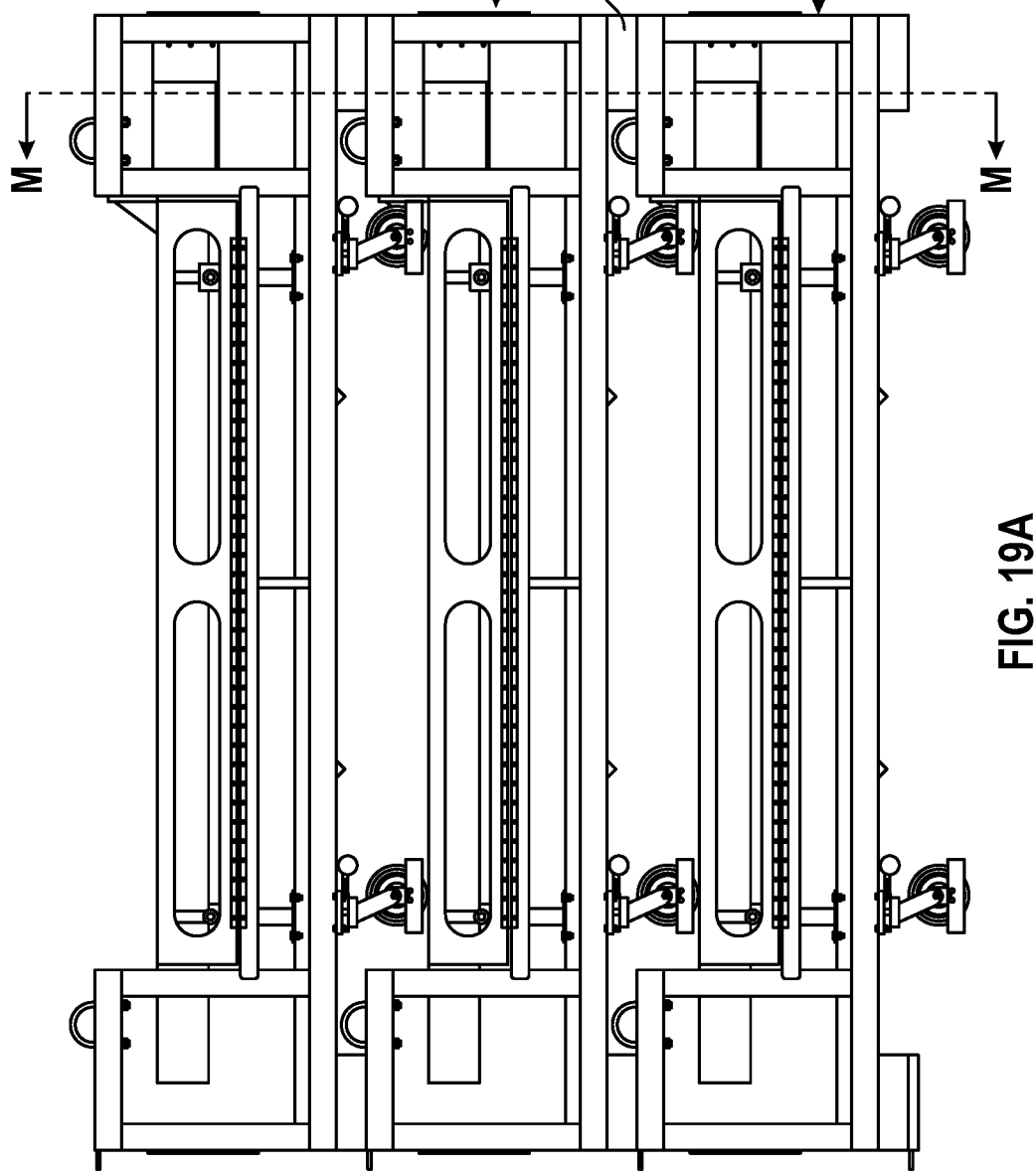
FIG. 19A is a side view of multiple material handling carts of FIG. 16A stacked on top of one another.

Frame 805 includes upper support frames 815 mounted to and extending up from the top side of frame 805 at each side end of frame 805. Likewise, frame 805 includes stacking blocks 809 comprising stacking block side members 809(*a*) and stacking block end members 809(*b*) mounted to the underside of frame 805 at each end of frame 805. Stacking blocks 809 serve to provide added structural support to frame 805 when a first cart 800 is positioned atop another cart 800(*a*), as shown in FIGS. 19A and 19B. Stacking block angle guides 809(*c*) are mounted to an underside of each such stacking block 809, and serve to guide a cart 800 into the proper stacking position atop a second cart 800(*a*) such that the stacking block side member 809(*a*) and stacking block angle guide 809(*c*) of an upper cart 800 align with and contact the top of the upper support frame 815 of a lower, second cart 800(*a*).

So as to enable hoisting of cart 800 using overhead cranes or other devices, a lift eye 817 (such as in the exemplary form of a U-bolt) is affixed to the top edge of each upper support frame 815. Each such lift eye 817 is positioned inward from an outer edge of its associated upper support frame 815 by a distance that is at least as long as stacking block side member 809(*a*) so as to avoid interference between the stacking block 809 of a first cart 800 and the lift eye 817 of a second cart 800(*a*) on which the first cart 800 is stacked. Likewise, each lift eye 817 has a height dimension that is less that the height dimension of stacking block 809 so as to avoid interference between the frame 805 of a first cart 800 and the lift eye 817 of a second cart 800(*a*) on which the first cart 800 is stacked.

Stacking block 809 also preferably includes one or more tow hooks 808 mounted to the underside of stacking block 809 so as to enable connection to a pushing or pulling device for movement from place to place, such as pusher 900 discussed above. Likewise, frame 805 is preferably provided forklift guides 807 mounted to the underside of frame 805 to aid in engagement with a forklift so that cart 800 may easily be lifted, moved, and stacked.

Cart 800 includes pivoting side walls 825 and pivoting end walls 827. Pivoting side walls 825 extend along the sides of cart 800 between adjacent upper support frames 815. The bottom of each pivoting side wall 825 is hinged to a fixed side wall mounting bar 826 such that pivoting side wall 825 may be pivoted downward towards the outside of cart 800 so as to allow access to component 500 when positioned in cart 800. A magnetic side wall holder 825(*a*) may hold pivoting side wall 825 in the closed position when fully raised. Similarly, pivoting end walls 827 extend along the ends of cart 800 between adjacent upper support frames 815. The bottom of each pivoting end wall 827 is hinged to a fixed end wall mounting bar 828 such that pivoting end wall 827 may be pivoted downward towards the outside of cart 800 so as to allow access to component 500 when positioned in cart 800. A magnetic side wall holder 827(*a*) may hold pivoting end wall 827 in the closed position when fully raised. Of course, each of pivoting side walls 825 and pivoting end walls 827 may likewise be opened/folded down for ease of loading and unloading component 500 from cart 800.

As with the configurations discussed above, cart 800 may likewise include roller support trolleys 830 that are variably positionable on trolley rail 840, and may be equipped with strap 833 to better secure component 500 to cart 800. Likewise, frame 805 (and particularly in the exemplary configuration of FIG. 16A) may mount such further elements as paperwork holder 874, in addition to a whiteboard, plastic bars, plastic storage pans, plastic storage bins, and magnetic trays (all not shown in FIGS. 16A-19B for clarity) as may be deemed appropriate to a particular use of cart 800.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, while the foregoing description sets for a cart for storage and transport particularly of engine turbine blades, those skilled in the art will recognize that the concepts embodied therein may likewise be applied to storage and transport carts for certain other components without departing from the spirit and scope of the invention. It should be understood, therefore, that the invention may be practiced otherwise than as specifically set forth herein.

What is claimed is:

1. A material handling cart, comprising:
   a frame;
   a plurality of wheels attached to a lower surface of the frame;
   a plurality of engaging members configured to support a part to be carried by the cart above the frame, wherein at least one of said engaging members is adjustably positionable along a longitudinal axis of the frame, wherein said engaging members are configured to mount said part for rotation about an axis that is parallel to said longitudinal axis of said frame, and wherein each said engaging member further comprises a roller support trolley having a plurality of rollers configured to directly engage with a cylindrical outer surface of the part when the part is carried by the cart so as to enable rotation of said part about an axis that is parallel to said longitudinal axis of the frame;
   a plurality of upper supports extending upward from the frame; and
   a plurality of lower stacking members affixed to the lower surface of the frame;
   wherein the lower stacking members are configured to engage upper supports of a second material handling cart having an identical configuration to said material handling cart so as to enable stacking of said material handling cart on top of said second material handling cart; and
   wherein the upper supports are configured to engage lower stacking members of a third material handling cart having an identical configuration to said material handling cart so as to enable stacking of said third material handling cart on top of said material handling cart.

2. The material handling cart of claim 1, wherein said upper supports and said lower stacking members have a combined height dimension sufficient to enable stacking of said material handling cart, said second material handling cart, and said third material handling cart without interference between said frames of said carts and said parts when said parts are carried by said material handling cart, said second material handling cart, and said third material handling cart.

3. The material handling cart of claim 1, wherein each said upper supports has a height dimension that is equal to or greater than a height dimension of the part when the part is carried by the cart.

4. The material handling cart of claim 1, said frame further comprising a trolley rail extending in a direction parallel to said longitudinal axis of the frame, wherein at least one of said roller support trolleys is moveably mounted to said trolley rail.

5. The material handling cart of claim 1, wherein at least one of said roller support trolleys further comprises an extensible strap configured for wrapping at least over a top of the part when the part is carried by the cart and engaging said at least one of said roller support trolleys.

6. The material handling cart of claim 1, wherein at least one of said roller support trolleys further comprises a cushion surface extending laterally across an outer edge of said at least one roller support trolley that is closest to an end of said cart, wherein said cushion surface is positioned on said roller support trolley to engage a lateral face of said part when said part is carried by said cart.

7. The material handling cart of claim 1, further comprising a plurality of side walls extending along parallel sides of the cart.

8. The material handling cart of claim 7, wherein at least one of said side walls further comprises a hinged pivoting section that is pivotable outwardly from the cart from a closed, upstanding position to an open, downward position.

9. The material handling cart of claim 8, said cart further comprising a magnetic side wall holder positioned on said cart to magnetically and releasably hold said hinged pivoting section in said closed, upstanding position.

10. The material handling cart of claim 7, further comprising a plurality of end walls extending along parallel ends of the cart and perpendicular to said side walls.

11. The material handling cart of claim 10, wherein at least one of said end walls further comprises a hinged pivoting section that is pivotable outwardly form the cart from a closed, upstanding position to an open, downward position.

12. The material handling cart of claim 11, said cart further comprising a magnetic end wall holder positioned on said cart to magnetically and releasably hold said hinged pivoting section in said closed, upstanding position.

13. The material handling cart of claim 1, further comprising a plurality of cushioning storage devices configured to receive distinct components associated with said part.

14. The material handling cart of claim 13, further comprising labels positioned adjacent a plurality of said cushioning storage devices and identifying a distinct component intended for storage in said plurality of cushioning storage devices.

15. The material handling cart of claim 13, further comprising a plurality of removable coins, wherein each said removable coin is removably positioned within a coin receiver adjacent one of said cushioning storage devices, and wherein each of said coins is repositionable within an adjacent one of said cushioning storage devices to indicate the absence of one of said distinct components.

16. The material handling cart of claim 1, said frame further comprising a plurality of forklift guides mounted to a bottom of said frame and positioned for engagement by a forklift for lifting said cart.

17. The material handling cart of claim 1, further comprising a white board mounted to an exterior of said cart.

18. The material handling cart of claim 1, further comprising a document carrier mounted to an exterior of said cart.

19. The material handling cart of claim 1, further comprising a magnetic tray mounted to said cart.

20. The material handling cart of claim 19, wherein said magnetic tray is positioned on said frame so as to sit beneath said part when said part is carried by said cart.

21. The material handling cart of claim 1, further comprising a plurality of lift eyes mounted to a plurality of said upper supports and configured for hoisting of said cart from an overhead lifting device.

22. The material handling cart of claim 1, further comprising a plurality of tow hooks mounted to said frame and configured for engagement with a towing device.

23. The material handling cart of claim 1, wherein each said wheel is rotatably mounted to a mounting arm, wherein said mounting arm extends downward from said frame, and a guard ring is mounted to said mounting arm and surrounds a portion of said wheel.

24. The material handling cart of claim 23, wherein a bottom edge of said guard ring is positioned horizontally above a bottom of said wheel.

25. The material handling cart of claim 1, wherein said wheels further comprise caster wheels, wherein at least one of said caster wheels is rotatable about a vertical axis, and wherein at least another one of said caster wheels is fixed and non-rotatable about a vertical axis.

26. The material handling cart of claim 1, further comprising a cart stacking base having a base frame, and a plurality of base upper supports extending upward from the base frame, wherein the base upper supports are configured to engage the lower stacking members of said material handling cart so as to enable stacking of said material handling cart on top of said cart stacking base.

27. The material handling cart of claim 26, said cart stacking base further comprising a plurality of forklift receiver frames configured for engagement by a forklift for lifting and moving of said cart stacking base.

* * * * *